US012528001B2

(12) United States Patent
VanDyke

(10) Patent No.: US 12,528,001 B2
(45) Date of Patent: Jan. 20, 2026

(54) AXIS ALIGN LOCK RELEASE MECHANISM FOR BASKETBALL SYSTEM

(71) Applicant: Lifetime Products, Inc., Clearfield, UT (US)

(72) Inventor: Lynn D VanDyke, Clearfield, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

(21) Appl. No.: 16/380,877

(22) Filed: Apr. 10, 2019

(65) Prior Publication Data

US 2019/0314696 A1 Oct. 17, 2019

Related U.S. Application Data

(60) Provisional application No. 62/656,206, filed on Apr. 11, 2018.

(51) Int. Cl.
*A63B 63/08* (2006.01)
*B25G 3/38* (2006.01)
*F16F 9/02* (2006.01)

(52) U.S. Cl.
CPC .............. *A63B 63/083* (2013.01); *B25G 3/38* (2013.01); *F16F 9/0263* (2013.01); *A63B 2209/00* (2013.01); *A63B 2225/093* (2013.01)

(58) Field of Classification Search
CPC .. A63B 63/083; A63B 2225/093; B25G 3/38; F16F 9/0263
USPC ........................................................ 473/483
See application file for complete search history.

(56) References Cited

U.S. PATENT DOCUMENTS

| 13,396 | A | 8/1855 | Perkins |
| 130,449 | A | 8/1872 | Stuart |
| 2,321,378 | A | 6/1943 | Green |
| 3,025,058 | A | 3/1962 | Brumfield |

(Continued)

FOREIGN PATENT DOCUMENTS

| CA | 3032721 A1 | * 6/2020 |
| CN | 2528493 | 1/2003 |
| CN | 2640548 | 9/2004 |

OTHER PUBLICATIONS

U.S. Appl. No. 13/403,226, filed Feb. 23, 2012, Astle.

(Continued)

*Primary Examiner* — Eugene L Kim
*Assistant Examiner* — Amir A Klayman
(74) *Attorney, Agent, or Firm* — Workman Nydegger

(57) ABSTRACT

One example of a basketball system includes a post, a backboard, a connecting structure that connects the backboard to the post, and a height adjustment mechanism operable to adjust a position of the backboard relative to a reference surface, and the height adjustment mechanism includes one or more arms connected to the connecting structure, an adjustment handle connected to the one or more arms and to the support structure, a gas shock including a locking pin and connected to the support structure, to the one or more arms, and to the adjustment handle, and an actuator arm connected to the adjustment handle and operable to change a disposition of the locking pin of the gas shock when the adjustment handle is operated so that the locking pin is moved between first and second dispositions which respectively correspond to a locked state and an unlocked state of the gas shock.

15 Claims, 23 Drawing Sheets

(56) References Cited

U.S. PATENT DOCUMENTS

| | | | |
|---|---|---|---|
| 3,467,377 A * | 9/1969 | Harbaugh | A63B 63/083 473/482 |
| 3,788,604 A | 1/1974 | Cameron | |
| 4,145,044 A | 3/1979 | Wilson | |
| 4,185,936 A | 1/1980 | Takahashi | |
| 4,285,518 A | 8/1981 | Pearo | |
| 4,375,934 A | 3/1983 | Elliott | |
| 4,424,968 A | 1/1984 | Smith | |
| 4,438,923 A | 3/1984 | Engle et al. | |
| 4,465,277 A | 8/1984 | Dittrich | |
| 4,723,777 A | 2/1988 | Jolly | |
| 4,762,319 A | 8/1988 | Krumholz | |
| 4,781,375 A | 11/1988 | Nye | |
| 4,805,904 A | 2/1989 | Nye | |
| 4,881,734 A | 11/1989 | Nye | |
| 5,067,277 A * | 11/1991 | Magalotti | F16F 9/0263 49/386 |
| 5,112,023 A | 5/1992 | Sowers | |
| 5,114,141 A | 5/1992 | Mahoney | |
| 5,120,054 A | 6/1992 | Wetzel | |
| 5,133,547 A | 7/1992 | Pardi | |
| 5,154,414 A | 10/1992 | Auer | |
| 5,165,565 A | 11/1992 | Schlessmann | |
| 5,207,407 A | 5/1993 | Fitzsimmons | |
| 5,211,393 A | 5/1993 | Rolffs | |
| 5,248,140 A | 9/1993 | Matherne | |
| 5,259,612 A | 11/1993 | Matherne | |
| 5,324,027 A | 6/1994 | Nye | |
| 5,375,835 A | 12/1994 | Van Nimwegen et al. | |
| 5,377,976 A | 1/1995 | Matherne | |
| 5,415,393 A | 5/1995 | Fitzsimmons | |
| 5,489,107 A | 2/1996 | Kho | |
| 5,556,088 A | 9/1996 | Mower | |
| 5,573,237 A | 11/1996 | Van Nimwegen et al. | |
| 5,586,759 A | 12/1996 | Fitzsimmons | |
| 5,695,417 A | 12/1997 | Winter et al. | |
| 5,730,668 A | 3/1998 | Hege | |
| 5,738,601 A | 4/1998 | Hughes | |
| 5,800,295 A | 9/1998 | Rogitz | |
| 5,816,955 A | 10/1998 | Nordgran | |
| 5,839,982 A | 11/1998 | Hying | |
| 5,879,247 A | 3/1999 | Winter et al. | |
| 5,893,809 A | 4/1999 | Coats et al. | |
| 6,004,231 A | 12/1999 | Schickert | |
| 6,042,297 A | 3/2000 | Lah | |
| 6,077,177 A | 6/2000 | Winter et al. | |
| 6,120,396 A | 9/2000 | Van Nimwegen et al. | |
| 6,135,901 A | 10/2000 | VanNimwegen | |
| 6,142,891 A | 11/2000 | Winter et al. | |
| 6,145,856 A | 11/2000 | Conti | |
| 6,155,938 A | 12/2000 | Mower | |
| 6,273,834 B1 | 8/2001 | Winter | |
| 6,283,878 B1 | 9/2001 | White | |
| 6,302,811 B1 | 10/2001 | Topham | |
| 6,334,822 B1 | 1/2002 | Zider | |
| 6,367,948 B2 | 4/2002 | Branson | |
| 6,402,644 B2 * | 6/2002 | Stanford | A63B 63/083 248/280.11 |
| 6,419,597 B1 | 7/2002 | VanNimwegen et al. | |
| 6,419,598 B1 * | 7/2002 | Winter | A63B 63/083 473/483 |
| 6,422,957 B1 | 7/2002 | Winter et al. | |
| 6,432,003 B1 | 8/2002 | Van Nimwegen et al. | |
| 6,468,373 B1 | 10/2002 | Grinwald | |
| 6,488,599 B2 | 12/2002 | Nye | |
| 6,645,095 B1 | 11/2003 | Winter et al. | |
| D484,200 S | 12/2003 | Nye | |
| 6,656,065 B2 | 12/2003 | Nye | |
| D484,933 S | 1/2004 | Stanford | |
| 6,699,146 B1 | 3/2004 | Winter et al. | |
| 6,758,768 B2 | 7/2004 | Spencer | |
| 6,769,668 B2 | 8/2004 | Siglock | |
| D498,800 S | 11/2004 | Nye | |
| 6,824,481 B1 | 11/2004 | Nye | |
| D503,441 S | 3/2005 | Stanford | |
| 6,866,596 B2 | 3/2005 | Steed | |
| 6,881,162 B2 | 4/2005 | Nye | |
| 6,916,257 B1 | 7/2005 | Van Nimwegen et al. | |
| 6,994,502 B2 | 2/2006 | Winter | |
| 7,001,290 B2 | 2/2006 | Mower | |
| 7,044,867 B2 | 5/2006 | Van Nimwegen et al. | |
| 7,048,655 B2 | 5/2006 | Nye | |
| 7,052,418 B2 | 5/2006 | Nye | |
| 7,097,574 B2 | 8/2006 | Nye | |
| 7,118,500 B2 | 10/2006 | Nye | |
| D532,466 S | 11/2006 | Nye | |
| 7,195,571 B2 | 3/2007 | Nye | |
| 7,331,883 B2 * | 2/2008 | Goldberg | A63B 63/083 473/483 |
| 7,393,293 B2 | 7/2008 | Guerzini | |
| 7,604,555 B2 | 10/2009 | Nye | |
| 7,691,014 B2 | 4/2010 | Nye | |
| 7,691,015 B2 | 4/2010 | Nye | |
| 7,775,917 B2 | 8/2010 | Nye | |
| 8,062,152 B2 | 11/2011 | Nye | |
| 8,172,706 B2 | 5/2012 | Peery | |
| 8,348,788 B2 | 1/2013 | Nye | |
| 8,992,350 B2 * | 3/2015 | Green | A63B 63/083 473/484 |
| 9,333,406 B1 * | 5/2016 | Weeder | A63B 63/083 |
| 9,675,859 B2 | 6/2017 | Green et al. | |
| 10,918,921 B2 * | 2/2021 | White | A63B 63/083 |
| 2001/0024984 A1 | 9/2001 | Stanford et al. | |
| 2002/0004431 A1 * | 1/2002 | Nye | A63B 63/083 473/483 |
| 2002/0094890 A1 | 7/2002 | White | |
| 2006/0116225 A1 | 6/2006 | Kilpatrick | |
| 2007/0191151 A1 | 8/2007 | Nye et al. | |
| 2008/0039242 A1 | 2/2008 | Nye | |
| 2009/0069130 A1 * | 3/2009 | Nye | A63B 63/083 473/483 |
| 2010/0084534 A1 | 4/2010 | Greenwood | |
| 2012/0028740 A1 | 2/2012 | Nye et al. | |
| 2012/0220397 A1 * | 8/2012 | Astle | A63B 63/08 473/484 |
| 2015/0367213 A1 | 12/2015 | Olsen | |
| 2017/0314731 A1 * | 11/2017 | Glaser | F16M 11/10 |

OTHER PUBLICATIONS

U.S. Appl. No. 11/625,677, filed Jan. 22, 2007, Nye.
U.S. Appl. No. 11/836,121, filed Aug. 8, 2007, Nye.
U.S. Appl. No. 13/253,762, filed Oct. 5, 2011, Nye.
U.S. Appl. No. 61/502,425, filed Jun. 29, 2011, Green.
U.S. Appl. No. 13/533,714, filed Jun. 26, 2012, Green.
U.S. Appl. No. 14/629,153, filed Feb. 23, 2015, Green.
U.S. Appl. No. 62/015,216, filed Aug. 19, 2014, Olsen.
U.S. Appl. No. 62/016,586, filed Jun. 24, 2014, Olsen.
U.S. Appl. No. 14/746,583, filed Jun. 22, 2015, Olsen.
Spalding Equipment—2500 Portable Backstop, Recreational Portables; www.spaldingequipment.com/products; Jun. 25, 2012.
International Search Report and Written Opinion of PCT/US2015/037129 dated Sep. 21, 2015, filed Jun. 23, 2015.
EP Official Communication for EP12174326.4 dated Jan. 7, 2013.
EP Search Report for EP12174326.4 dated Oct. 1, 2012.
Chinese Office Action for CN 200880000008 dated Dec. 2, 2010.
Chinese Office Action for CN 200880000008 dated Oct. 26, 2011.
U.S. Appl. No. 13/253,762, filed Jan. 20, 2012, Office Action.
U.S. Appl. No. 13/253,762, filed Jun. 1, 2012, Final Office Action.
U.S. Appl. No. 13/253,762, filed Jul. 6, 2012, Notice of Allowance.
U.S. Appl. No. 13/253,762, filed Sep. 14, 2012, Notice of Allowance.
U.S. Appl. No. 12/192,046, filed Aug. 4, 2010, Office Action.
U.S. Appl. No. 12/192,046, filed Apr. 4, 2011, Final Office Action.
U.S. Appl. No. 12/192,046, filed Jun. 23, 2011, Advisory Action.
U.S. Appl. No. 12/192,046, filed Jul. 18, 2011, Notice of Allowance.
U.S. Appl. No. 11/836,121, filed Jun. 1, 2009, Office Action.
U.S. Appl. No. 11/836,121, filed Mar. 5, 2010, Final Office Action.
U.S. Appl. No. 11/836,121, filed Jun. 25, 2011, Office Action.
U.S. Appl. No. 11/836,121, filed Dec. 7, 2011, Final Office Action.

(56) References Cited

OTHER PUBLICATIONS

U.S. Appl. No. 11/836,121, filed Dec. 28, 2012, Office Action.
U.S. Appl. No. 11/836,121, filed Jun. 13, 2013, Final Office Action.
U.S. Appl. No. 11/625,677, filed May 6, 2009, Office Action.
U.S. Appl. No. 11/625,677, filed Mar. 10, 2010, Final Office Action.
U.S. Appl. No. 11/625,677, filed Jul. 27, 2010, Advisory Action.
U.S. Appl. No. 11/625,677, filed Sep. 23, 2010, Office Action.
U.S. Appl. No. 11/625,677, filed Apr. 14, 2011, Final Office Action.
U.S. Appl. No. 11/625,677, filed Mar. 19, 2012, Office Action.
U.S. Appl. No. 11/625,677, filed Aug. 30, 2012, Final Office Action.
U.S. Appl. No. 11/625,677, filed Apr. 29, 2013, Office Action.
U.S. Appl. No. 11/625,677, filed Nov. 1, 2013, Notice of Allowance.
U.S. Appl. No. 13/533,714, filed Aug. 21, 2014, Office Action.
U.S. Appl. No. 13/533,714, filed Nov. 24, 2014, Notice of Allowance.
U.S. Appl. No. 14/629,153, filed Aug. 3, 2016, Restriction Requirement.
U.S. Appl. No. 14/629,153, filed Oct. 17, 2016, Office Action.
U.S. Appl. No. 14/629,153, filed Feb. 3, 2017, Notice of Allowance.
U.S. Appl. No. 14/746,583, filed Nov. 15, 2016, Office Action.

* cited by examiner

AXIS ALIGN LOCK RELEASE MECHANISM FOR BASKETBALL SYSTEM

RELATED APPLICATIONS

This application hereby claims priority to, and the benefit of, U.S. Provisional Patent Application, Ser. 62/656,206, entitled AXIS ALIGN LOCK RELEASE MECHANISM FOR BASKETBALL SYSTEM, and filed on Apr. 11, 2018. All of the aforementioned applications are incorporated herein in their respective entireties by this reference.

FIELD OF THE INVENTION

The present disclosure is generally concerned with basketball systems. More specifically, at least some of the disclosed embodiments are concerned with basketball systems that include an adjustment mechanism for changing the height of the goal relative to a playing surface.

BACKGROUND

Many portable basketball systems are relatively large in size, and may also be quite heavy. As a result, a number of height adjustment mechanisms have been devised. However, typical conventional designs are mechanically complex and employ a large number of parts.

ASPECTS OF SOME EXAMPLE EMBODIMENTS

It should be noted that the embodiments disclosed herein do not constitute an exhaustive summary of all possible embodiments, nor does this brief summary constitute an exhaustive list of all aspects of any particular embodiment(s). Rather, this brief summary simply presents selected aspects of some example embodiments. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular technical effect(s) or solution(s).

Disclosed embodiments are concerned with a basketball system, and components of a basketball system such as, for example, a height adjustment mechanism that is user-operable to raise and lower a backboard and associated goal relative to a playing surface. Such basketball systems may be in-ground basketball systems, or portable basketball systems. As such, combinations of any one or more of the following elements are considered to define example embodiments of the invention: a connecting structure that comprises one or more sets of arms that rotatably connect a backboard or backboard frame to a support post; one or more arms that rotatably connect an adjustment handle to a connecting structure; a lockable gas spring that is rotatably connected at a first end to a support post and is rotatably connected at a second end to one or more arms; a lockable gas spring that is rotatably connected at a first end to a support post and is rotatably connected at a second end to an actuator arm which, in turn, is rotatably connected to an adjustment handle; an adjustment handle that is rotatably connected to one, or both of, a support post and one or more arms; an adjustment handle that includes a first handle portion, and a second handle portion that is movable relative to the first handle portion; a movable handle portion that defines an axis that is movable relative to an axis defined by another handle portion; a first handle portion that defines an axis that is movable relative to an axis defined by a second handle portion so that the axis defined by the first handle portion can be selectively moved by a user into, and out of, substantial alignment with the axis defined by the second handle portion; an adjustment handle including a movable handle portion that defines an axis that is movable relative to another axis defined by another handle portion, and a default configuration of the adjustment handle is when the axes are unaligned with each other; an adjustment handle including a movable handle portion that defines an axis that is movable relative to another axis defined by another handle portion, and a default configuration of the adjustment handle is when the axes are unaligned with each other, the default configuration being maintained by one or more biasing elements unless/until the bias imposed by the biasing element(s) is overcome in response to an action performed by a user which causes the axes to become substantially aligned with each other; an adjustment handle including a movable handle portion that defines an axis that is movable relative to another axis defined by another handle portion such that when the axes are unaligned with each other, rotation of the adjustment handle relative to a support post is prevented, and when the axes are substantially aligned with each other, rotation of the adjustment handle relative to the support post is enabled; a movable handle portion that is connected to an actuator arm; a movable handle portion that is rotatably connected to an actuator arm; an actuator arm operably disposed with respect to a locking pin of a biasing element, one example of which is a gas shock; an actuator arm having a first portion that is rotatable about a first axis, and a second portion that is rotatable about a second axis; an actuator arm having a first portion that is rotatable about a first axis, and a second portion that is rotatable about a second axis, and the second axis is parallel to the first axis; an actuator arm configured so that a linear motion of a first portion of the actuator arm causes a rotational motion of a second portion of the actuator arm; and, an actuator arm configured so that a rotational motion of a portion of the actuator arm causes a linear motion of a locking pin of a biasing element, one example of which is a gas shock.

In at least some embodiments, a portion, or all, of various basketball system elements may be constructed of blow molded plastic, one example of which is high-density polyethylene (HDPE), although other plastics can alternatively be used. Examples of basketball system elements that can be made of blow molded plastic include a backboard, and a base. The backboard may alternatively be made of glass, although no particular material is required. The scope of this disclosure is not limited to blow molding processes or blow molded elements however. Thus, other example processes that may be used to construct a portion, or all, of any of the aforementioned components include roto-molding, vacuum molding, drape molding, and processes sometimes referred to as twin-sheet processes including twin-sheet molding. Any of these processes may produce a component that is partly, or completely, hollow. Finally, it will also be appreciated that components of a basketball system need not be constructed from plastic and may be constructed using other materials having other suitable characteristics.

As noted above, any component of a basketball system that is constructed at least partly of blow molded plastic may have an interior that is partly, or completely, hollow. Such embodiments may also include, disposed in the interior, one or more depressions, sometimes referred to as "tack-offs." In such embodiments, these tack-offs may be integrally formed as part of a unitary, one-piece structure during the blow molding process. The depressions may extend from a first surface, such as a first interior surface of a component, towards a second surface, such as a second interior surface of the component. The ends of one or more depressions may contact or engage the second surface, or the ends of one or more of the depressions may be spaced apart from the second surface by a distance.

In some instances, one or more depressions on a first interior surface may be substantially aligned with corresponding depressions on a second interior surface, and one or more depressions on the first interior surface may contact one or more corresponding depressions on the second interior surface or, alternatively, one or more depressions on the first interior surface may be spaced apart from corresponding depressions on the second interior surface. In still other instances, depressions that contact each other, and depressions that are spaced apart from each other, may both be present in a component of a basketball system. The depressions may be sized and configured to strengthen and/or reinforce the basketball system component.

BRIEF DESCRIPTION OF THE DRAWINGS

The appended drawings contain figures of some example embodiments to further explain various aspects of the present disclosure. It will be appreciated that these drawings depict only some embodiments of the disclosure and are not intended to limit its scope in any way. The disclosure will be described and explained with additional specificity and detail through the use of the accompanying drawings.

DETAILED DESCRIPTION OF SOME EXAMPLE EMBODIMENTS

Figure 1:
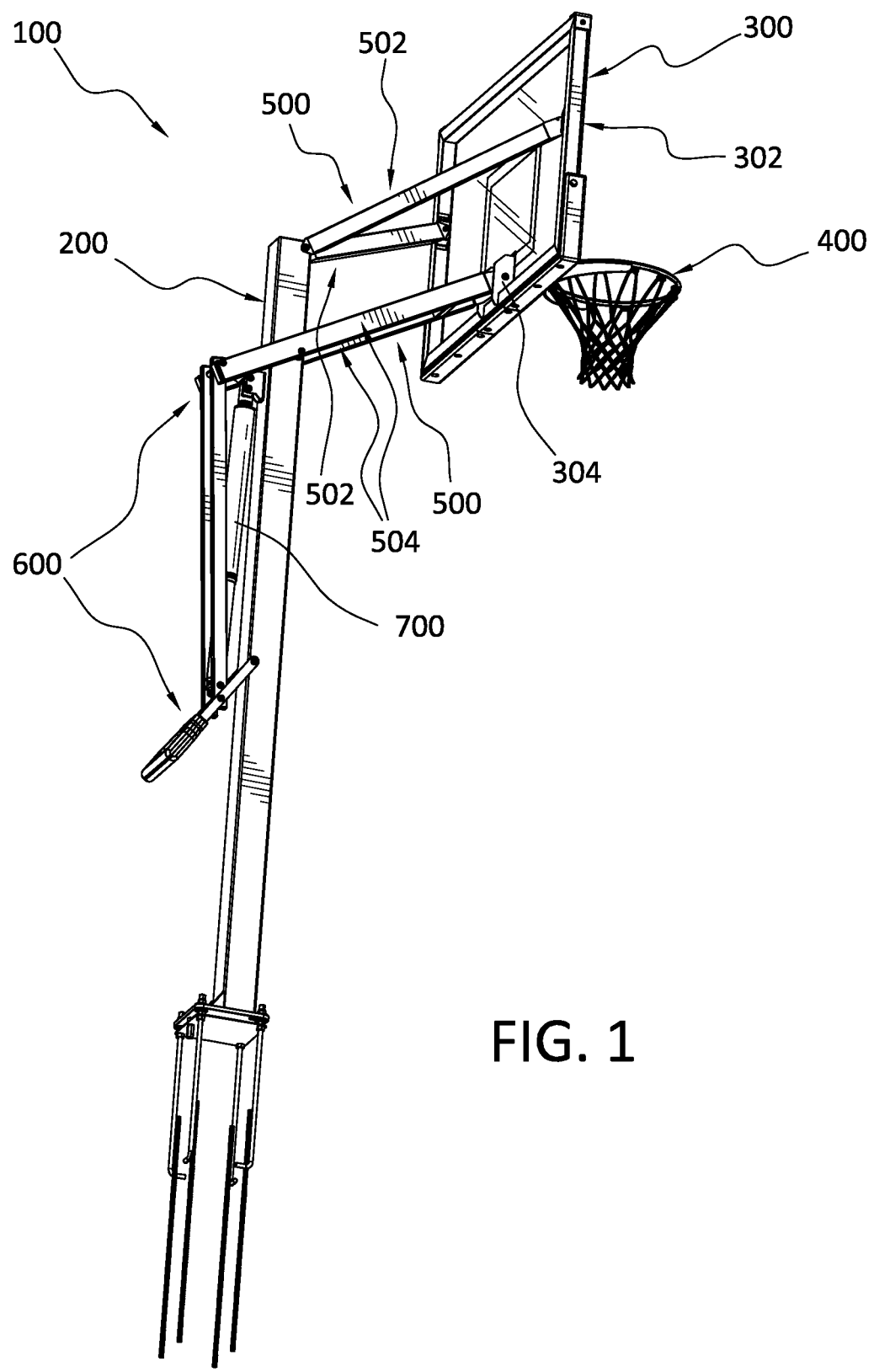
FIGS. 1-6 disclose various aspects of an example basketball system and associated support structure and connecting structure.

The present disclosure is generally concerned with basketball systems. More specifically, at least some of the disclosed embodiments are concerned with basketball system components such as a height adjustment mechanism operable to change the height of a backboard and associated goal relative to a playing surface.

A. General Aspects of Some Example Embodiments

In general, basketball system components disclosed herein may be constructed with a variety of components and materials including, but not limited to, plastic (including blow molded plastic structures and elements), including polycarbonates, composites, metals, and combinations of any of the foregoing. Suitable metals may include steel, aluminum, and aluminum alloys, although the skilled person will understand that a variety of other metals may be employed as well and the scope of the invention is not limited to the foregoing examples. Where metal is employed in the construction of a basketball system component, the metal elements may take one or more forms including, but not limited to, pipe, square tube, rectangular tube, round tube, pipe, angles, flatbar, I-shapes, T-shapes, L-shapes, and combinations and portions of any of the foregoing.

Depending upon the material(s) employed in the construction of the basketball system, a variety of methods and components may be used to connect, releasably or permanently, various elements of the basketball system. For example, the various elements of a basketball system or basketball system component within the scope of this disclosure may be attached to each other by any one or more of allied processes such as welding or brazing, and/or mechanically by way of fasteners such as bolts, screws, pins, and rivets, for example.

Some, none, or all portions of one or more of the basketball system components may be coated or otherwise covered with paint, rubber, plastic or other materials, or any combination of the foregoing. Surface treatments and textures may also be applied to portions of the basketball system. At least some of such materials may serve to help prevent, or reduce, rust and corrosion.

Where blow molded components are employed in one or more embodiments, such components may also include, disposed in the interior, one or more depressions, sometimes referred to as "tack-offs." In such embodiments, these tack-offs may be integrally formed as part of a unitary, one-piece structure during the blow molding process. The depressions may extend from a first surface, such as a first interior surface of the component, towards a second surface, such as a second interior surface of the component. The ends of one or more depressions may contact or engage the second surface, or the ends of one or more of the depressions may be spaced apart from the second surface by a distance. In some instances, one or more depressions on a first interior surface may be substantially aligned with corresponding depressions on a second interior surface, and one or more depressions on the first interior surface may contact one or more corresponding depressions on the second interior surface or, alternatively, one or more depressions on the first interior surface may be spaced apart from corresponding depressions on the second interior surface. In still other instances, depressions that contact each other and depressions that are spaced apart from each other may both be present in a blow molded component. The depressions may be sized and configured to strengthen and/or reinforce the blow molded component.

Finally, the present disclosure refers to various elements being connected to each other in various ways. Such elements may be connected directly to each other, or indirectly to each other. Where no particular connection is specified, the various elements may be connected either directly, or indirectly, to each other.

In the case of a direct connection, a first element may be releasably connected to a second element and held in that arrangement by one or more retaining elements such as a pin, screw, sleeve, bolt, rivet, shaft, or stud, to name some examples. Alternatively, and still with reference to the case of the direct connection, the first element and second element may be directly, and permanently, connected to each other such as by welding, brazing, or any other process that effects a permanent connection between the elements. With reference to the case of an indirect connection, a first element may be indirectly connected to a second element by virtue of both of those elements being connected to one or more intervening elements. This indirect connection may be implemented by way of one or more retaining elements such as a pin, screw, sleeve, bolt, rivet, shaft, or stud, to name some examples. Alternatively, and still with reference to the case of an indirect connection, the first element and second element may be indirectly, and permanently, connected to each other by way of one or more intervening elements to which the first element and second element are attached, such as by welding, brazing, or any other process that effects a permanent connection between the elements.

B. Structural Aspects of Some Example Embodiments

Directing attention initially to FIGS. 1-6, aspects of an example basketball system 100 are disclosed. In the disclosed example, the basketball system 100 includes a support structure 200, such as a post for example, a base (not shown) which receives the support structure 200, and a backboard 300 having a goal 400. In some embodiments, the goal 400 may be attached to the backboard 300 by way of a breakaway mechanism, which can include one or more springs for example, such that the goal 400 is able to temporarily change position relative to the backboard 300. The backboard 300 is connected to the support structure 200 by way of a connecting structure 500. A height adjustment mechanism 600 enables a user to adjust the vertical position and/or the orientation of the backboard 300 and goal 400.

The base may be a substantially hollow structure formed by blow molding or another suitable process. Bases of other construction can alternatively be employed however. The base can be filled with sand, water or other materials to aid in stability. Similar to the base, the backboard 300 may be a substantially hollow structure formed by blow molding or another suitable process.

Figure 6:
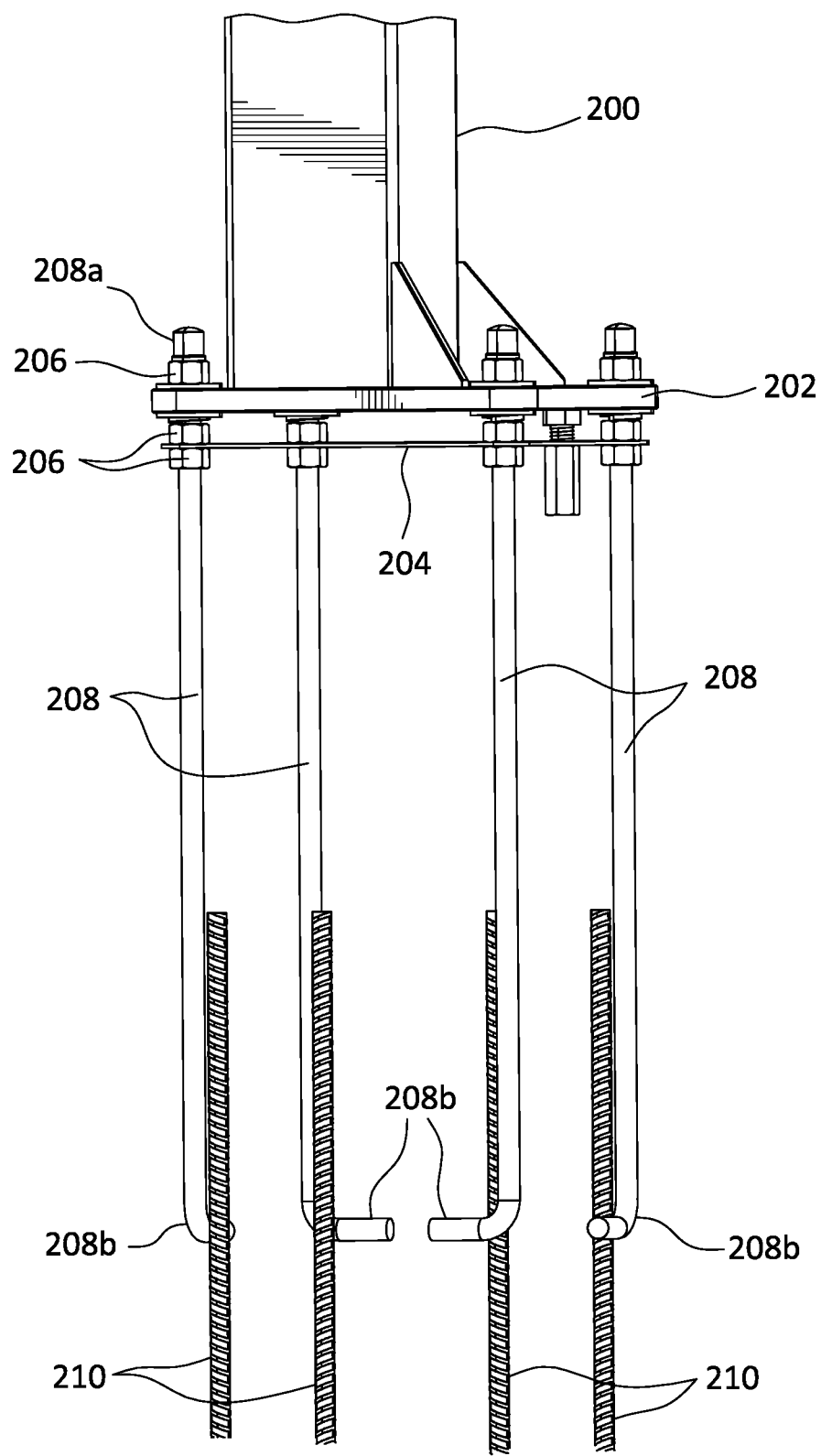

In some alternative embodiments, the base (not shown) is omitted and the support structure 200 is configured with a plate 202 that may be welded, or otherwise attached, to the bottom of the support structure 200, as best shown in FIG. 6. Another plate 204 may be provided that is spaced apart from the plate 202, such as by nuts 206 or other elements. The nuts 206 may threadingly engage corresponding threads 208a disposed at the ends of one or more support rods 208 which extend through the plates 202 and 204. One or more of the support rods 208 may include a bend 208b or other feature that is configured and arranged to be disposed in wet concrete, and/or other materials, so that after the concrete has set up, the support structure 200 will be securely anchored in the concrete. Rebar 210 may also be provided to aid in anchoring the support structure 200 in concrete and/or other materials. The rebar 210 may be attached to the support rods 208 by wire, welding, or other materials/processes, although such attachment is not necessarily required.

With continued attention to FIGS. 1-6, the connecting structure 500 can include one or more upper arms 502, and one or more lower arms 504. The upper arms 502 and lower arms 504 may be configured to move in unison with each other to raise/lower the backboard 300. Thus arranged, the arms 502 and arms 504 may collectively form a parallelogram arrangement that is deformed, or changes its configuration, as the backboard 300 is raised or lowered.

In the illustrated example, the example connecting structure 500 includes a total of four arms 502/504. The two upper arms 502 each include a first end that is rotatably connected to a frame 302 to which the backboard 300 is attached, and a second end of each of the upper arms 502 is rotatably connected to the support structure 200. In the illustrated embodiment, the upper arms are connected at, or near, the top of the support structure 200. The two lower arms 504 each include a first end that is rotatably connected to a respective bracket 304 that, in turn, is connected to the backboard 300 and/or frame 302. As well, the lower arms 504, which are longer than the arms 502 in at least some embodiments, are rotatably connected to the support structure 200 at a location, along the arms 504, that is between the first ends of the arms 504 and the second ends of the arms 504. Thus, as shown in FIG. 1 for example, the second ends of the arms 504 extend beyond the support structure 200. As a result of the configuration, arrangement, and attachment, of the arms 502 and 504, the backboard 300 is able to move up and down, as well as towards, and away from, the support structure 200. It is noted that the aforementioned and other rotatable connections disclosed herein can be implemented with pins, sleeves, bolts, rivets, shafts, or studs, or any other suitable mechanism(s), although no particular configuration of a rotatable connection is required.

With continued reference to FIGS. 1-6, the example basketball system 100 includes, as noted earlier, a height adjustment mechanism 600. In the illustrated example, the height adjustment mechanism 600 includes a pair of arms 602, each of which has a first end rotatably connected to a lower end of a respective arm 504. The second, lower, ends of the arms 602 are each rotatably connected to an adjustment handle 604 and the adjustment handle 604 is, in turn, rotatably connected to the support structure 200. The height adjustment mechanism 600 further includes a gas shock 700, or other element(s) of comparable functionality, that is connected at one end to the support structure 200, and the other end of the gas shock 700 is connected to the adjustment handle 604.

It is noted here that the gas shock 700 is an example structural implementation of a means for biasing any one or more of the arms 502, arms 504, arms 602, backboard 300, and goal 400, into a desired position and/or orientation. The scope of the invention is not limited to gas shocks, and any other structure(s) of comparable functionality may be alternatively employed.

In at least some embodiments, only a single gas shock 700 is needed, and employed. Thus, such embodiments may be advantageous relative to conventional systems that may employ a plurality of gas shocks. Nonetheless, it may be useful in some alternative embodiments to employ multiple gas shocks, such as two, three, or more, gas shocks, one or more of which may be connected with a respective, or common, actuator arm or comparable mechanism. In such arrangements, the multiple gas shocks may all be operable with a single adjustment handle in the same general manner as disclosed herein. In some embodiments, one or more springs (not shown) may be provided along with the gas shock 700. Such springs may be connected at one end to the support structure 200, and at the other end to one or both of the arms 602.

In general, the gas shock 700 may, among other things, provide a damping effect such that when it is unlocked, the gas shock 700 may exert a bias that tends to resist the upward, downward, and/or rotational, motion of the arms 504, the arms 602, and the adjustment handle 604, so that no sudden changes occur in the position of the backboard 300 when the gas shock 700 is unlocked. Put another way, and as noted elsewhere herein, the gas shock 700 may serve to bias, for example, the arms 504 and/or the arms 602 into a desired position and/or orientation, which bias can be overcome when the user unlocks the gas shock 700 and then moves the adjustment handle 604 to raise or lower the backboard 300 and goal 400. This functionality of the gas shock 700 may also make it relatively easier for a user to raise, and lower, the backboard 300. When the gas shock 700 is locked, motion of the arms 602, adjustment handle 604, and arms 504 is prevented, such that upward or downward movement of the backboard 300 is likewise prevented.

As discussed in more detail below, the gas shock 700 may be lockable, such as by way of a locking pin, so that when the gas shock 700 is locked, the end of the gas shock 700 that is connected to the arms 602 is prevented from moving relative to the end of the gas shock 700 that is connected to the support structure 602. In this way, the overall length of the gas shock 700 is temporarily fixed, that is, prevented from increasing or decreasing. When the gas shock 700 is unlocked, the end of the gas shock 700 that is connected to the arms 602, by way of a clevis 750, is free to move toward, and away from, the other end of the gas shock 700 that is connected to the support structure 200, such that the overall length of the gas shock 700 can be adjusted, that is, made shorter or longer. In this way, the movement and positioning of the backboard 300 can be controlled by the user.

Figure 2:
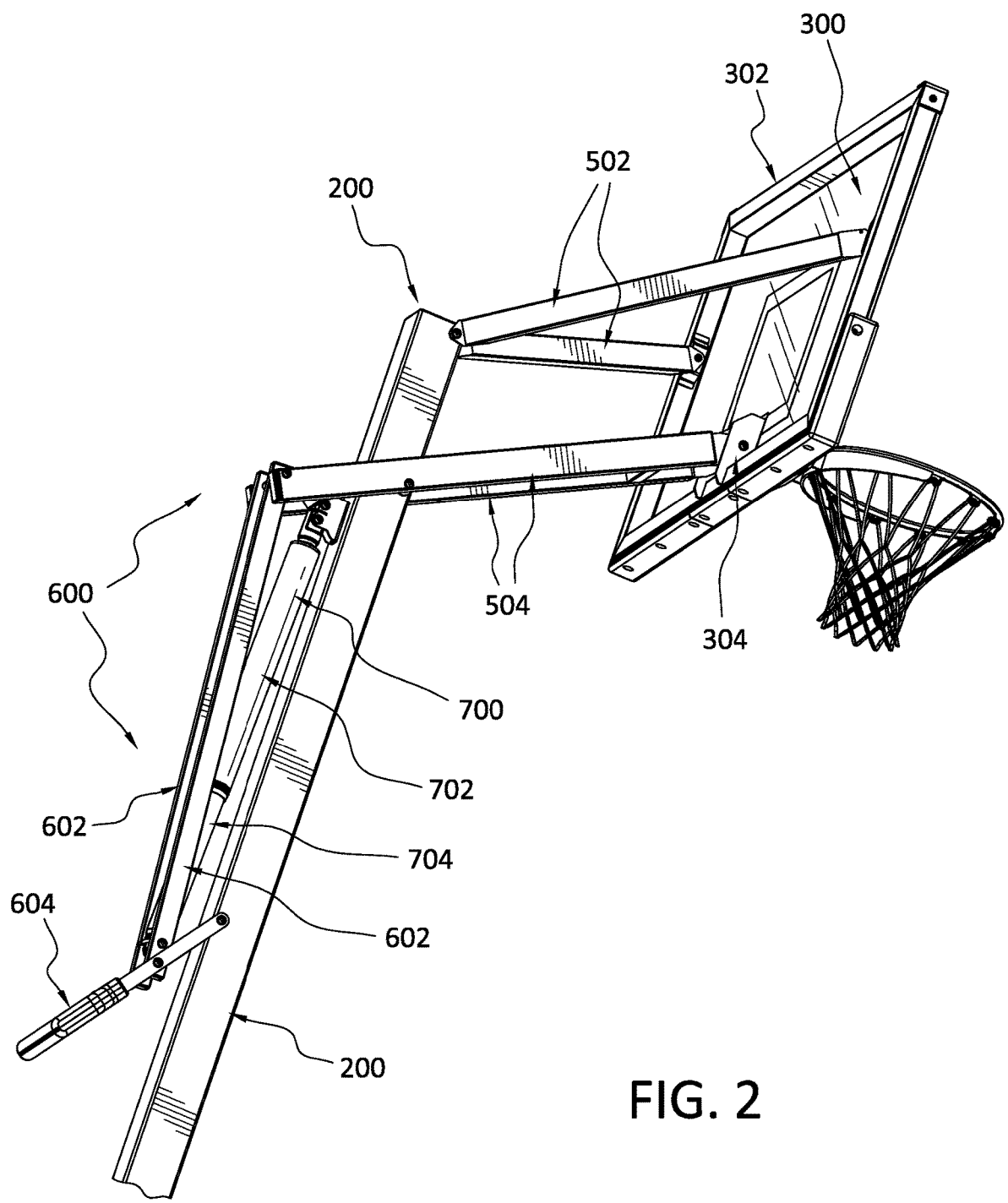
Figure 2A:
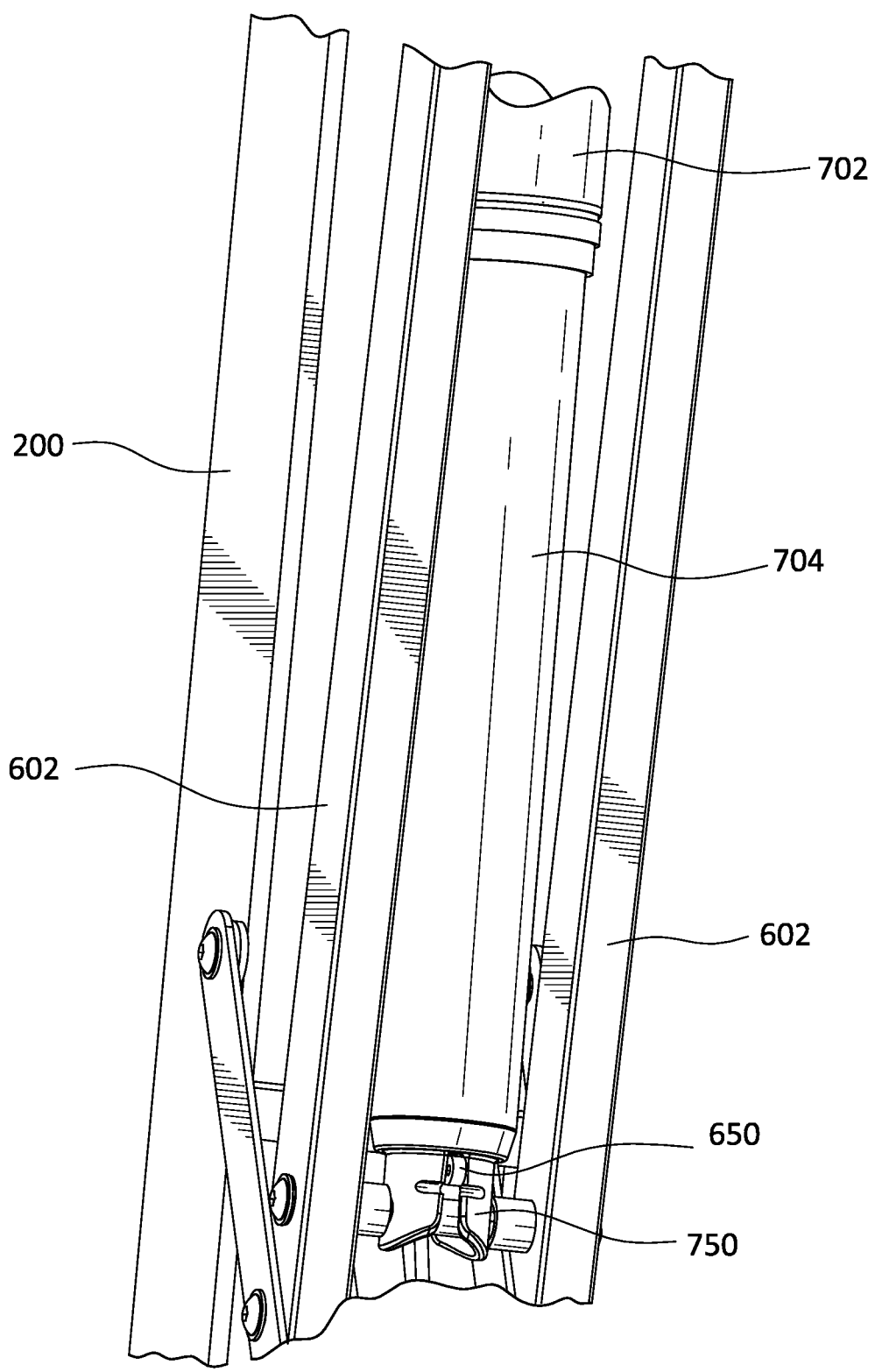

In the illustrated embodiment indicated in FIG. 2, and detail FIG. 2a, the upper end of the gas shock is a housing 702 within which a lower portion, or rod, 704 of the gas shock 700 is slidingly received for reciprocal motion with respect to the housing 702. As such, in the illustrated example, it is the housing 702 of the gas shock which is connected to the support structure 200, while the rod 704 of the gas shock 700 is connected to the clevis 750 which, in turn, is rotatably connected to the arms 602. The rod 704 is also connected indirectly to the adjustment handle 604 by way of the clevis 750, to which is rotatably connected an actuator arm 650 that also rotatably connects to the adjustment handle 604. Further details concerning the connection of the gas shock 700 to various other components are provided elsewhere herein (see, e.g., FIG. 12).

With more particular reference to the locking of the gas shock 700, when the gas shock 700 is in a locked state, the rod 704 is prevented from moving relative to the housing 702, and when the gas shock 700 is in an unlocked state, the rod 704 is movable relative to the housing 702. That is, the extent to which the rod 704 is received in the housing 702 can be modified such that the overall length of the gas shock 700 can be made longer, or shorter, when the gas shock 700 is unlocked. When the gas shock 700 is unlocked, the rod 704 is movable relative to the housing 702, but may nonetheless tend to resist motion so as to provide, for example, the damping effect noted above.

Figure 3:
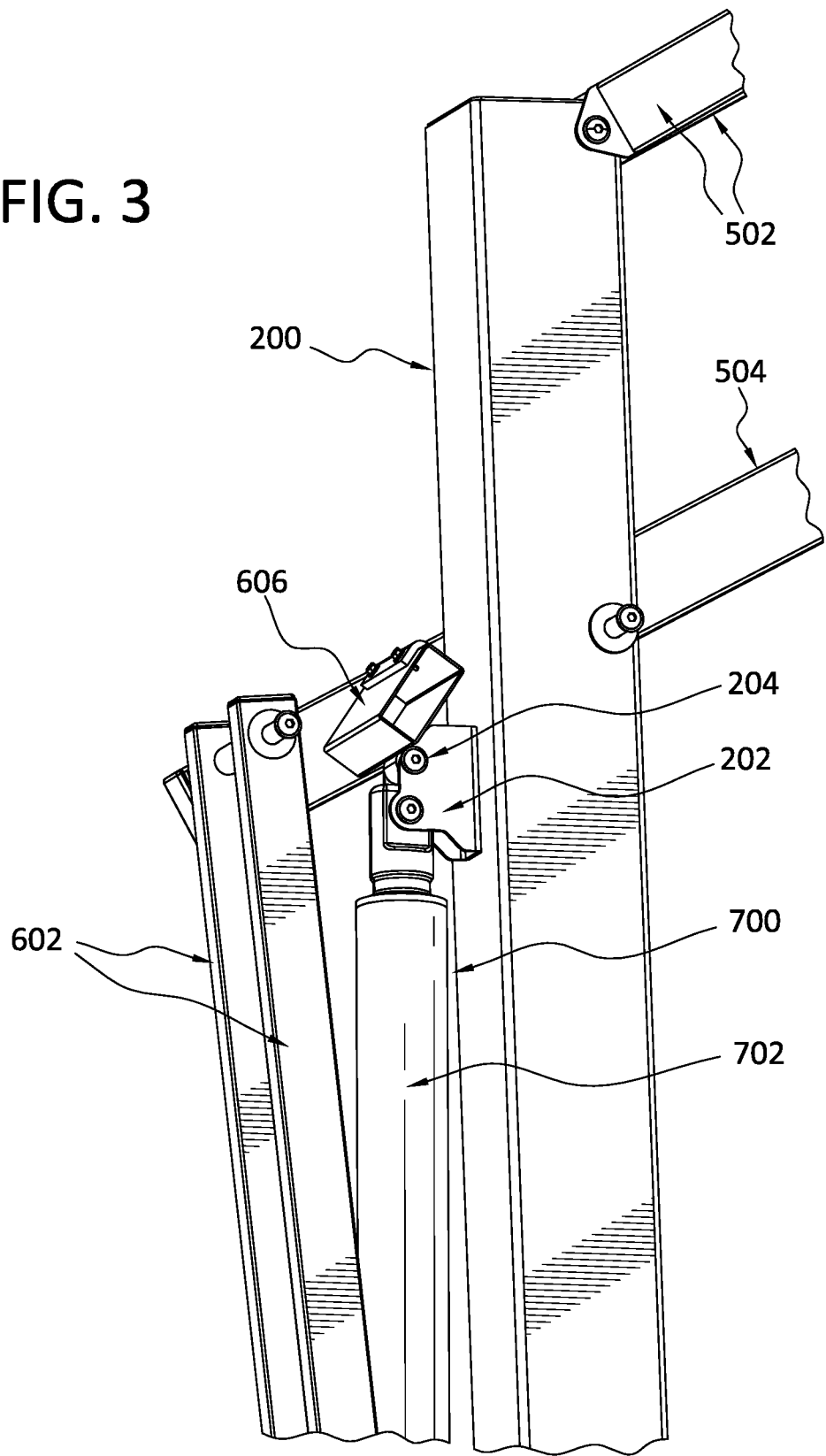
Figure 4:
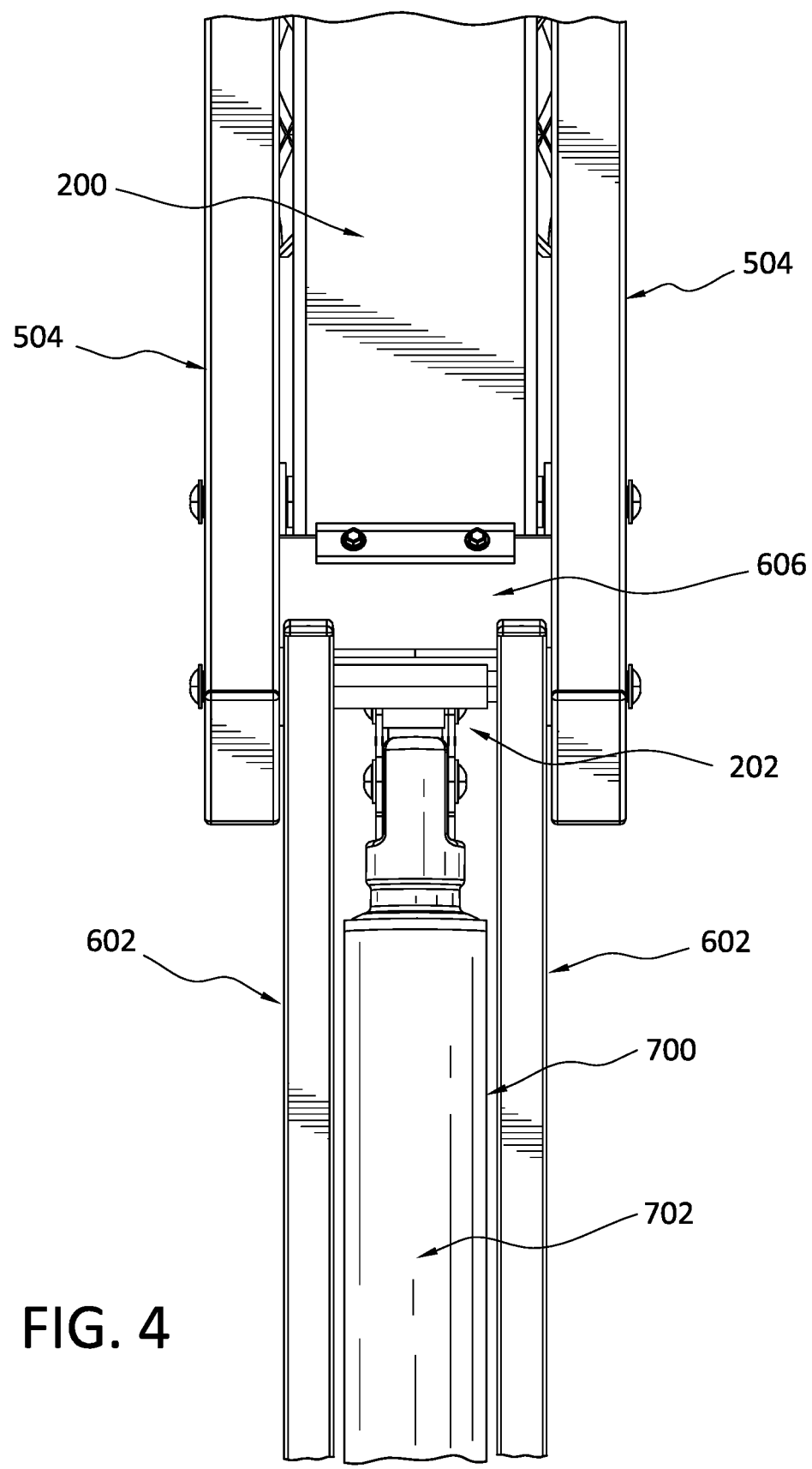
Figure 5:
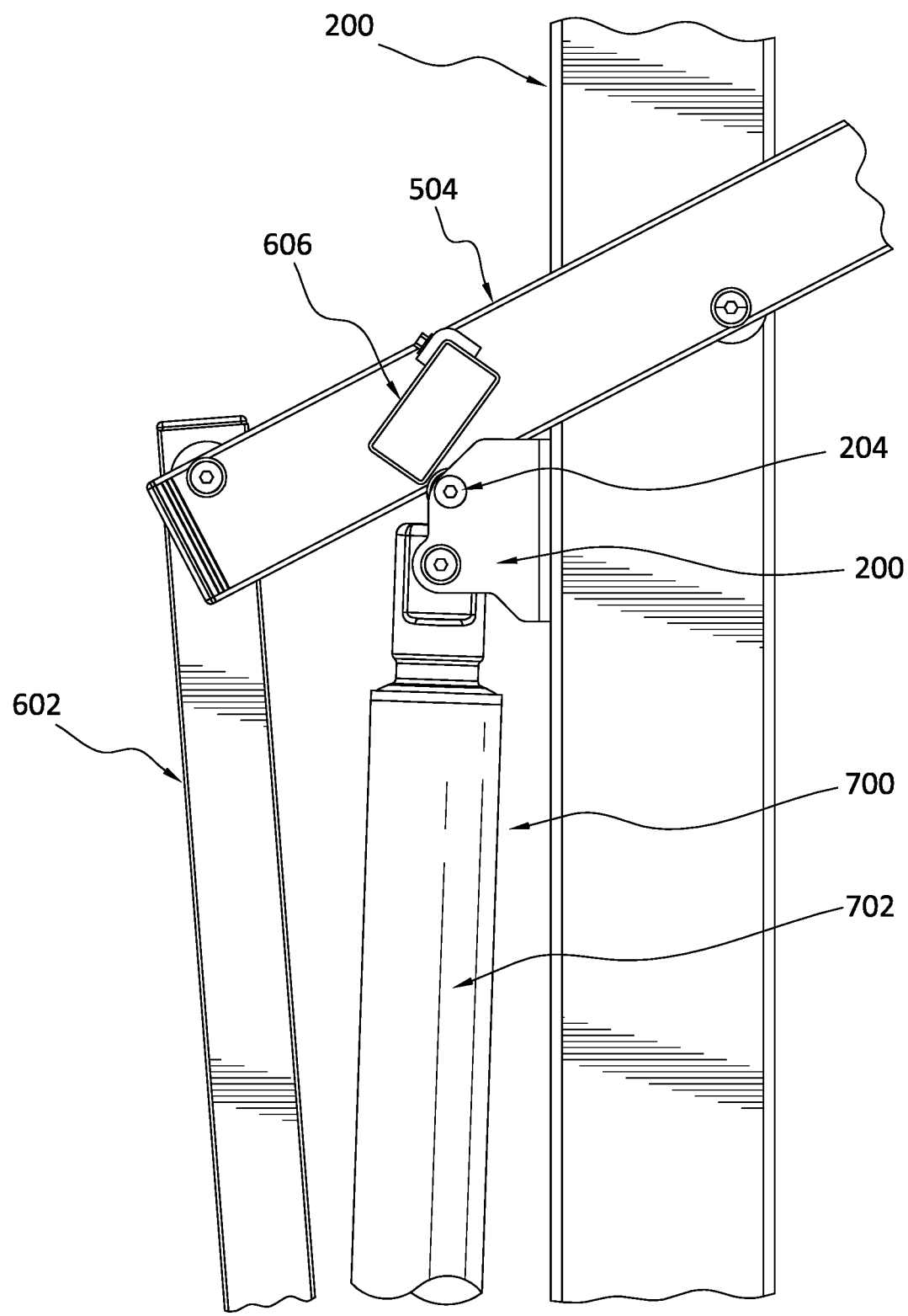

As shown in FIG. 3, for example, the housing 702 may be rotatably connected to a bracket 202 of the support structure 200. The bracket 202 may include a roller 204, or other type of stop, that limits the downward motion of the arms 504 by virtue of contact between the roller 204 and a limiter 606 that is connected between the arms 504. In some embodiments, the roller 204 may comprise, or consist of, metal, rubber, or plastic.

C. Example Adjustment Handle

Figure 7:
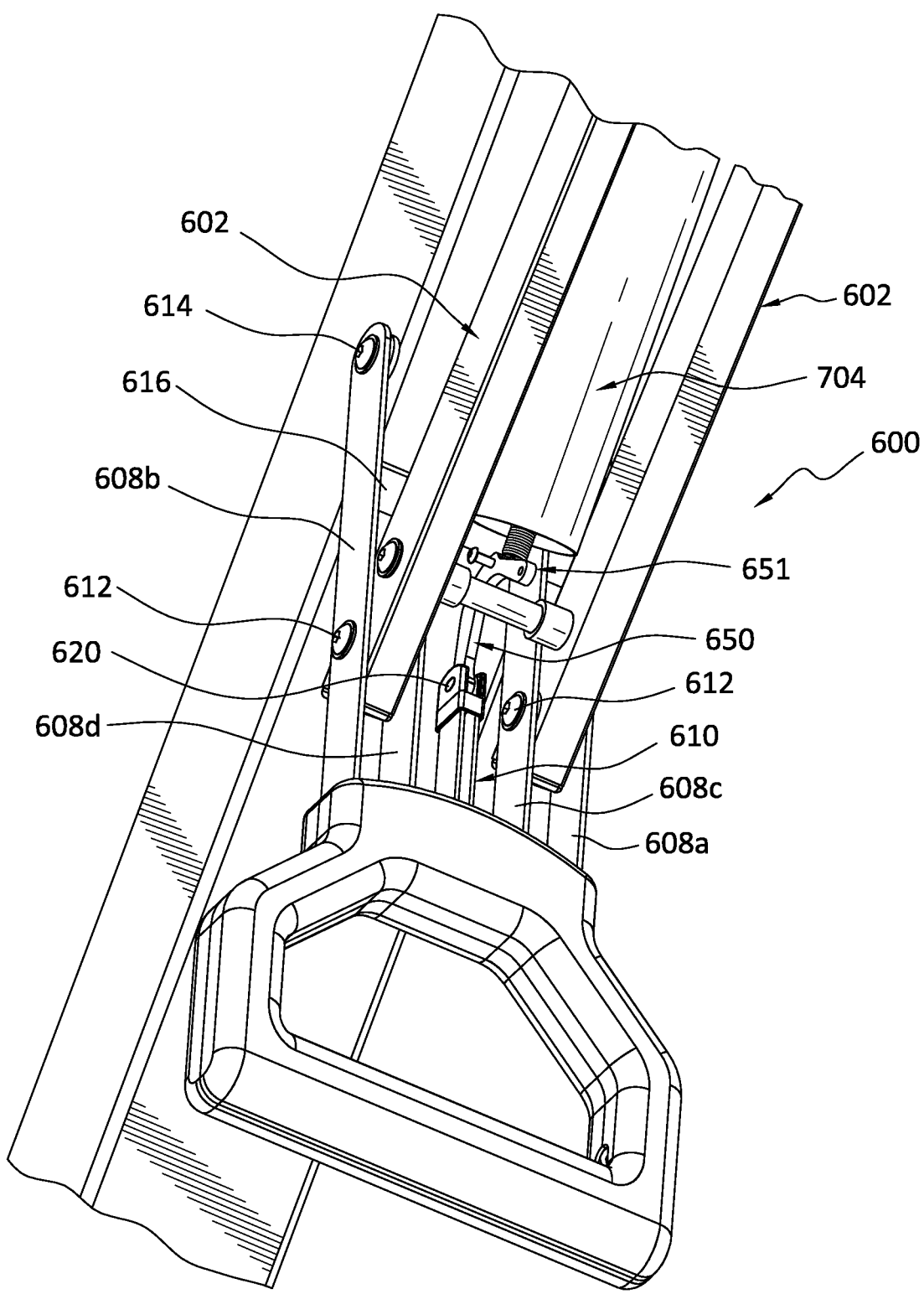
FIGS. 7-9 disclose various aspects of an example adjustment handle of a height adjustment mechanism.
Figure 7A:
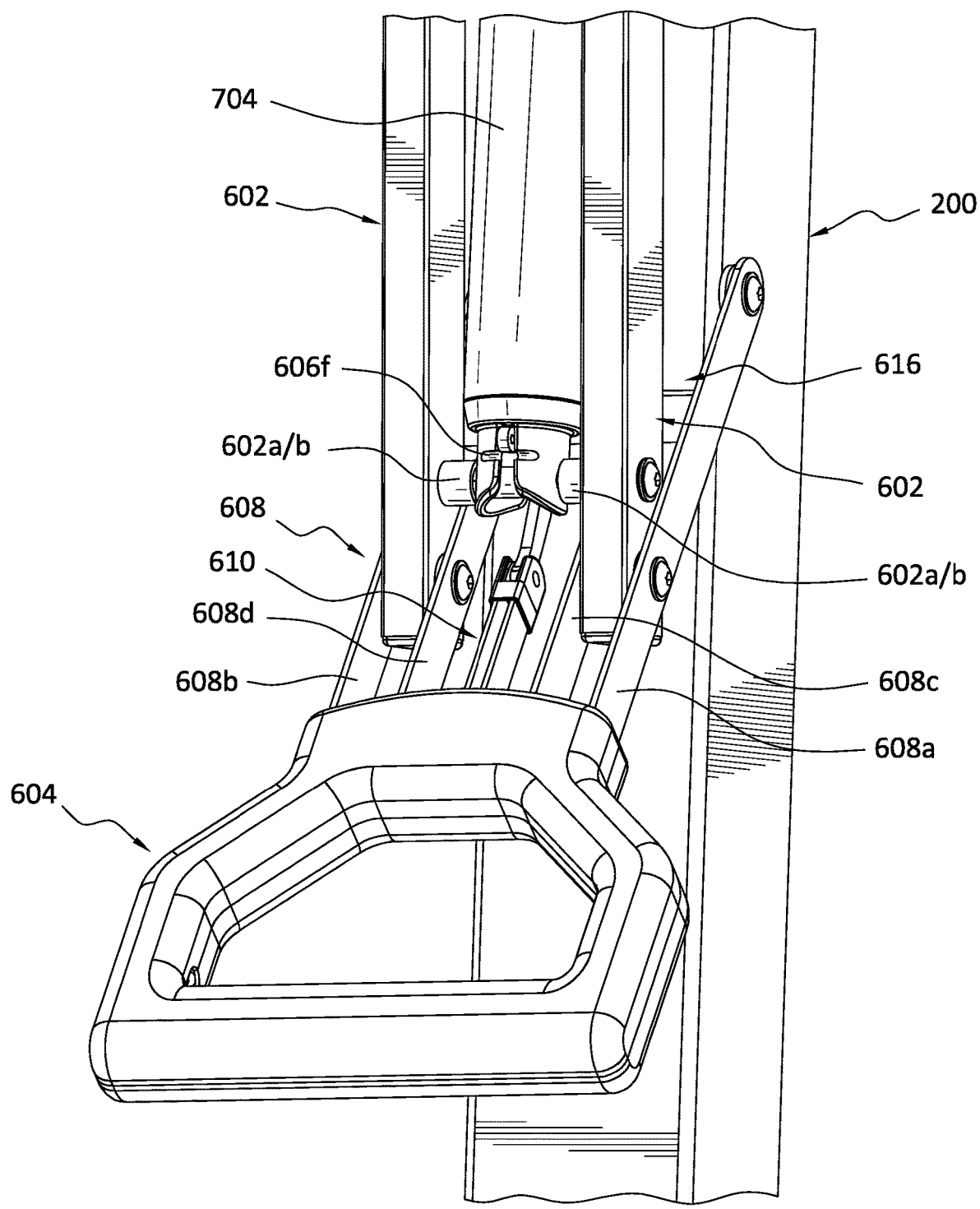
Figure 8:
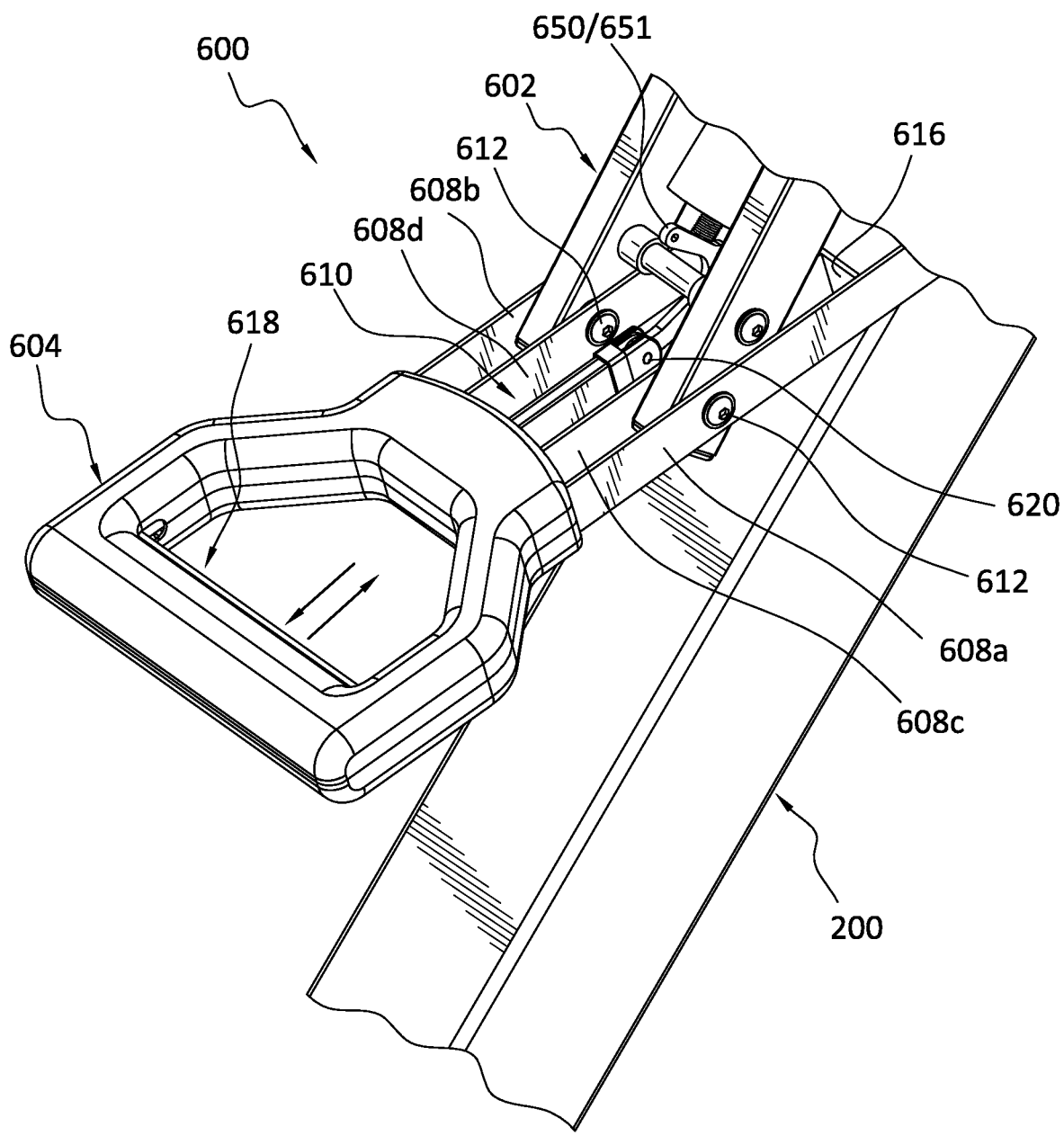
Figure 9:
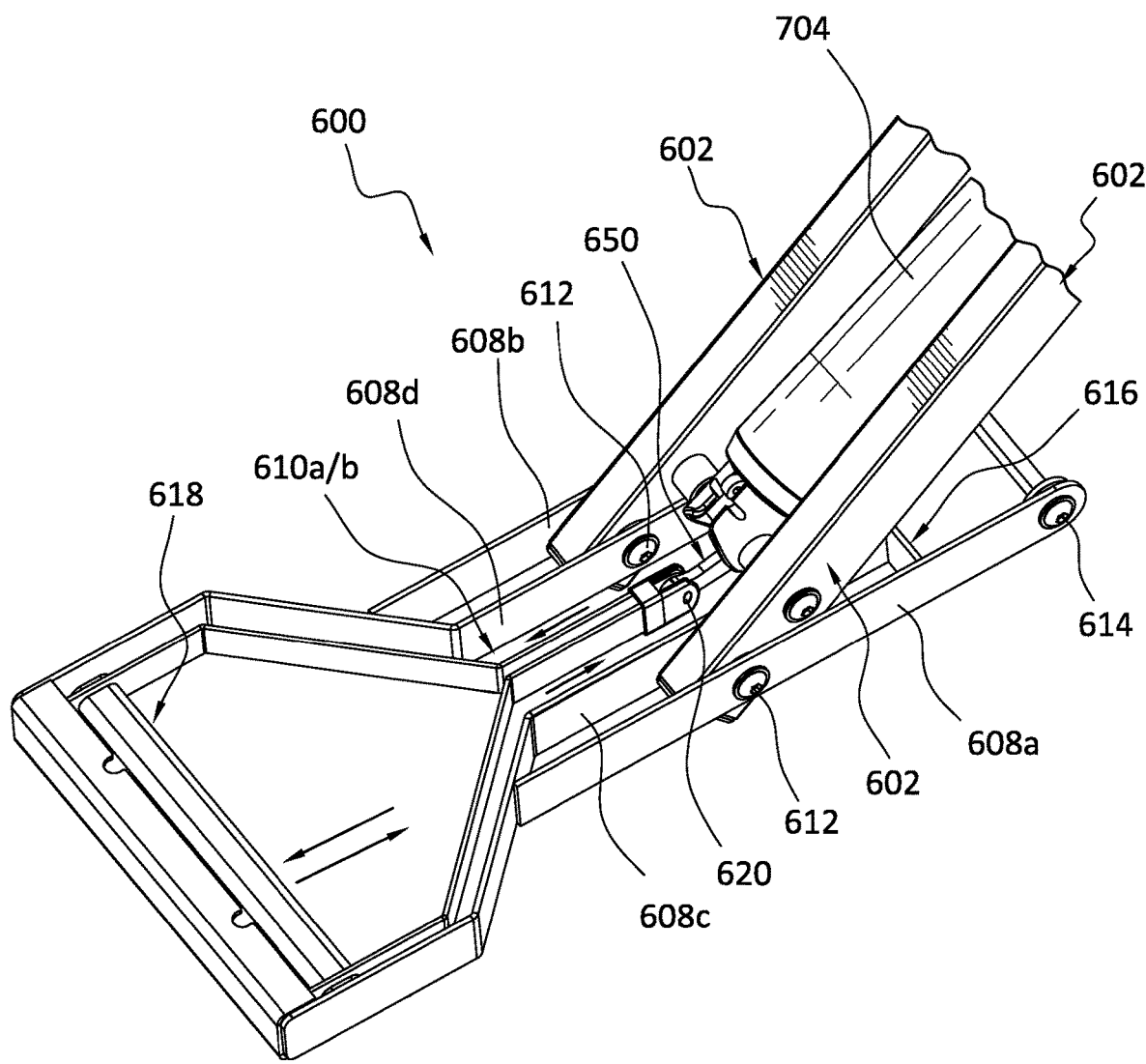

With particular reference now to FIGS. 7-9, further details are provided concerning the example adjustment handle 604 and various associated components. The adjustment handle 604 may include a first handle portion, denoted generally at 608, and a second handle portion, denoted generally at 610.

In general, the second handle portion 610 is movable relative to the first handle portion 608.

As shown, the first handle portion 608 may include a pair of arms 608a and 608b, each of which is rotatably connected to a respective arm 602 by a pin 612, and to the support structure 200 by a pin 614. The arms 608a and 608b may be reinforced by a crosspiece 616 extending between, and attached to, the arms 608a and 608b. The first handle portion 608 further includes another pair of arms 608c and 608d, each of which is rotatably connected to a respective arm 602 by a pin 612 and also fixed at one end to the crosspiece 616 that is attached to the arms 608a and 608b. Among other things, the crosspiece 616 may prevent, or reduce, twisting of the arms 608a and 608b, as well as twisting of the arms 608c and 608d, when the height adjustment mechanism 600 is operated.

With continued reference to FIGS. 7-9, the second handle portion 610 includes arms 610a and 610b that are configured for reciprocal motion in response to a corresponding movement of a grip element 618 of the adjustment handle 604. As such, movement of the arms 610a and 610b of the second handle portion 610 causes a corresponding movement of an actuator arm 650 that is rotatably connected to the arms 610a and 610b by way of a pin 620 that extends through an opening 650f defined in the actuator arm 650. More particularly, and as discussed in detail below, movement of the arms 610a and 610b toward and away from the user causes, or results from, a rotational motion of the actuator arm 650. Thus, movement of the arms 610a and 610b to the left (in FIG. 9) causes, or results from, rotation of the actuator arm 650 in a first direction, while movement of the arms 610a and 610b to the right (in FIG. 9) causes, or results from, rotation of the actuator arm 650 in a second direction that is opposite to the first direction.

Figure 10:
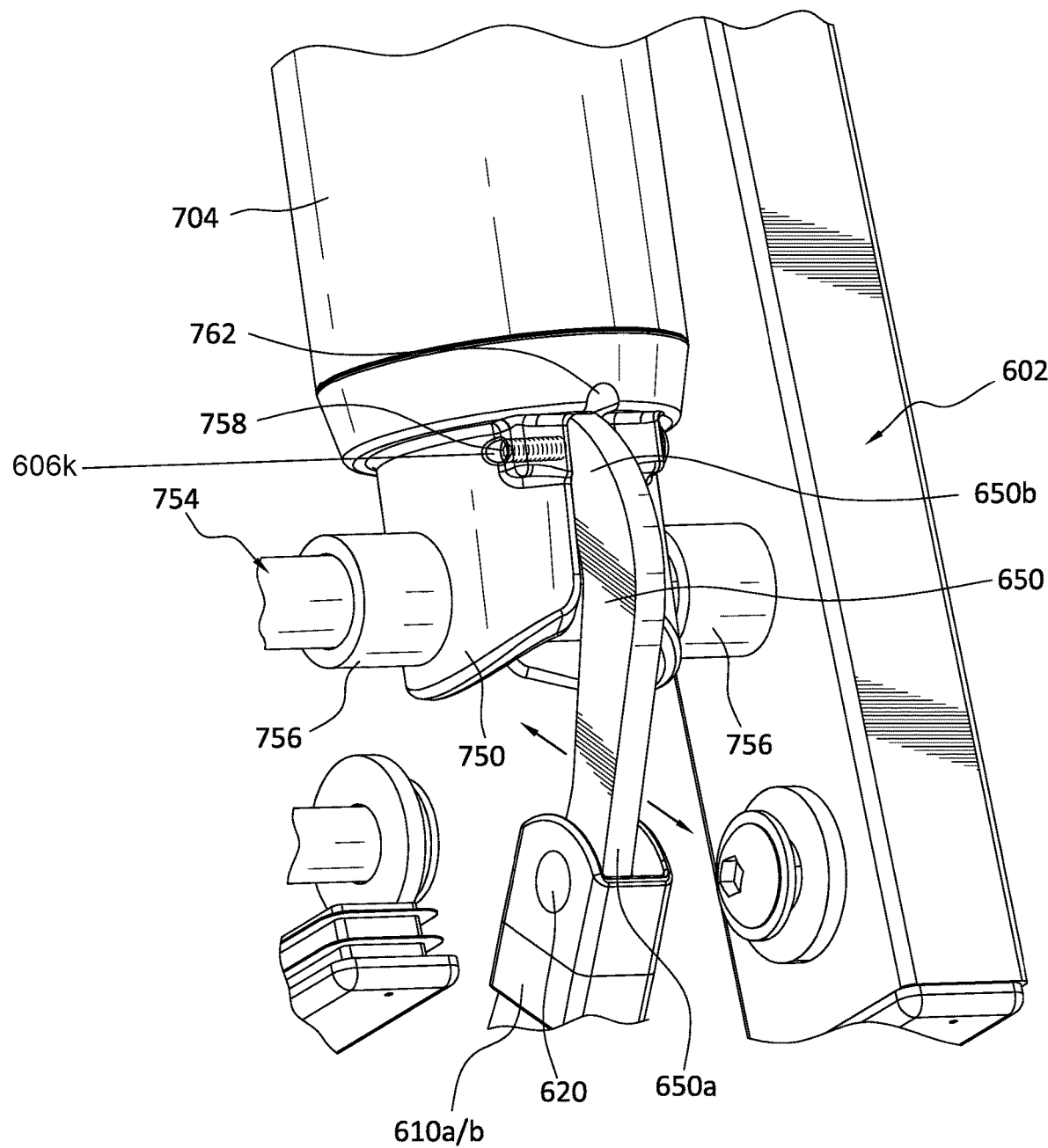
FIGS. 10-12e disclose various aspects of the structure and operation of an example clevis and example actuator arm.
Figure 11:
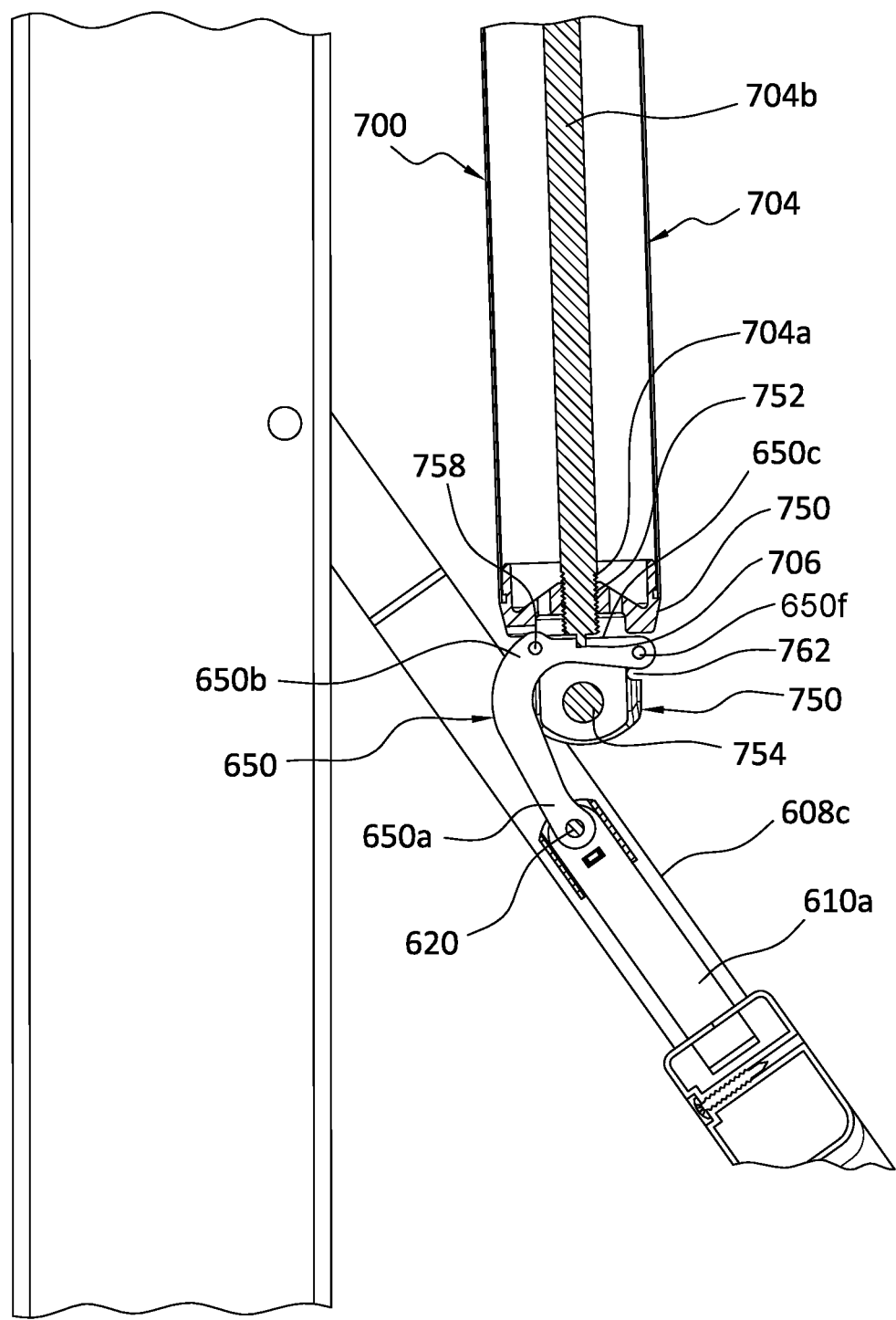

With reference now to FIGS. 10-12e, it can be seen that the gas shock 700 includes a clevis 750. As best shown in FIG. 11, the clevis 750 may include a threaded portion 752 configured and arranged to engage corresponding threads 704a of an internal shaft 704b of rod 704 of the gas shock 700. In this way, the clevis 750 can be removably attached to the gas shock 700 by way of the internal shaft 704b of the rod 704.

The clevis 750 is also rotatably connected to the arms 602 by way of a pin 754 that may be housed inside a pair of sleeves 756 which serve to maintain the position of the clevis 750 with respect to the arms 602. The pin 754 passes through a pair of openings 756 defined by the clevis 750.

The clevis 750 is also rotatably connected to the actuator arm 650 by way of a pin 758, which may take the form of a bolt that is threaded at each end but not in the middle, and which may engage corresponding threads in a passageway 606k defined by the clevis 750, and which may pass through an opening 650e defined by the actuator arm 650. The clevis 750 may include a cutout 762 or similar configuration to accommodate the rotational motion (indicated by the arrows in FIG. 10) of the actuator arm 650. With continued reference to FIGS. 9 and 10, it can be seen that a linear motion of the arms 610a and 610b (indicated by arrows in FIG. 9) corresponds both to a linear movement and rotational movement of the lower part 650a of the actuator arm 650, while the same linear motion of the arms 610a and 610b corresponds to only a rotational movement of the upper part 650b of the actuator arm 650.

While not shown in FIG. 10 (but see FIGS. 11 and 12), and as noted earlier, the gas shock 700 includes a movable locking pin 706 disposed within the clevis 750 and arranged for contact with the actuator arm 650 such that the actuator arm 650, moving under the influence of the arms 610a and 610b, as well as the grip element 618 and locking pin 706, rotates into, and out of, contact with the locking pin 706.

In general, the shape and position of the actuator arm 650 are such that as the actuator arm 650 rotates into contact with the locking pin 706, the locking pin 706 is depressed by the actuator arm 650 and the gas shock 700 is thereby unlocked. When the user releases the grip element 618, the locking pin 706 is free to act and, under the influence of a biasing element, such as a spring (not shown) for example, the locking pin 706 moves the actuator arm 650 into a position in which the locking pin 706 is no longer depressed by the actuator arm 650, that is, a position in which the gas shock 700 is locked. At the same time, the arms 610a and 610b move away from the user, by virtue of their connection to the actuator arm 650.

In the foregoing example, the actuator arm 650 is only in contact with the locking pin 706 when the gas shock is unlocked. In other embodiments however, the actuator arm 650 is always in contact with the locking pin 706 but due to the shape of the actuator arm 650, the locking pin 706 is depressed by the actuator arm 650 in some dispositions of the actuator arm 650. In other dispositions of the actuator arm 650, the locking pin 706 is not depressed by the actuator arm 650.

While, in the foregoing examples, movement of the actuator arm 650 to positions that respectively correspond to locked and unlocked positions is effected by way of the locking pin 706, other embodiments are configured such that movement of the actuator arm 650 to positions that respectively correspond to locked and unlocked positions of the locking pin 706 is effected by way of the grip element 618. Particularly, in at least some of such embodiments, the grip element 618 and, accordingly, the arms 610a and 610b, may be biased, such as by one or more springs or other resilient element(s) (not shown), in a direction away from a user (in FIG. 9) so that the user must overcome the bias imposed on the arms 610a and 610b in order to move the grip element 618 toward the user (in FIG. 9). That is, in this example, the locking pin 706 does not act to change the position of the actuator arm 650. Rather, the release of the grip element 618 by the user causes rotation of the actuator arm 650 to a position in which the actuator arm is no longer exerting a force on the locking pin 706. As such, the biased locking pin 706 is then free to extend to the locked position.

However, regardless of whether movement of the actuator arm 650 is effected by the locking pin 706 or by the grip element 618, movement of the grip element 618 toward the user (left in FIG. 9), such as may occur when the user squeezes the grip element 618, unlocks the gas shock 700, while movement of the grip element 618 away from the user locks the gas shock 700. Thus, the grip element 618 enables the user to (i) unlock the gas shock 700, (2) move the backboard 300 to a desired position and orientation, and (iii) lock the gas shock 700 after the backboard 300 has been positioned.

D. Further Aspects of an Example Actuator Arm

Figure 12:
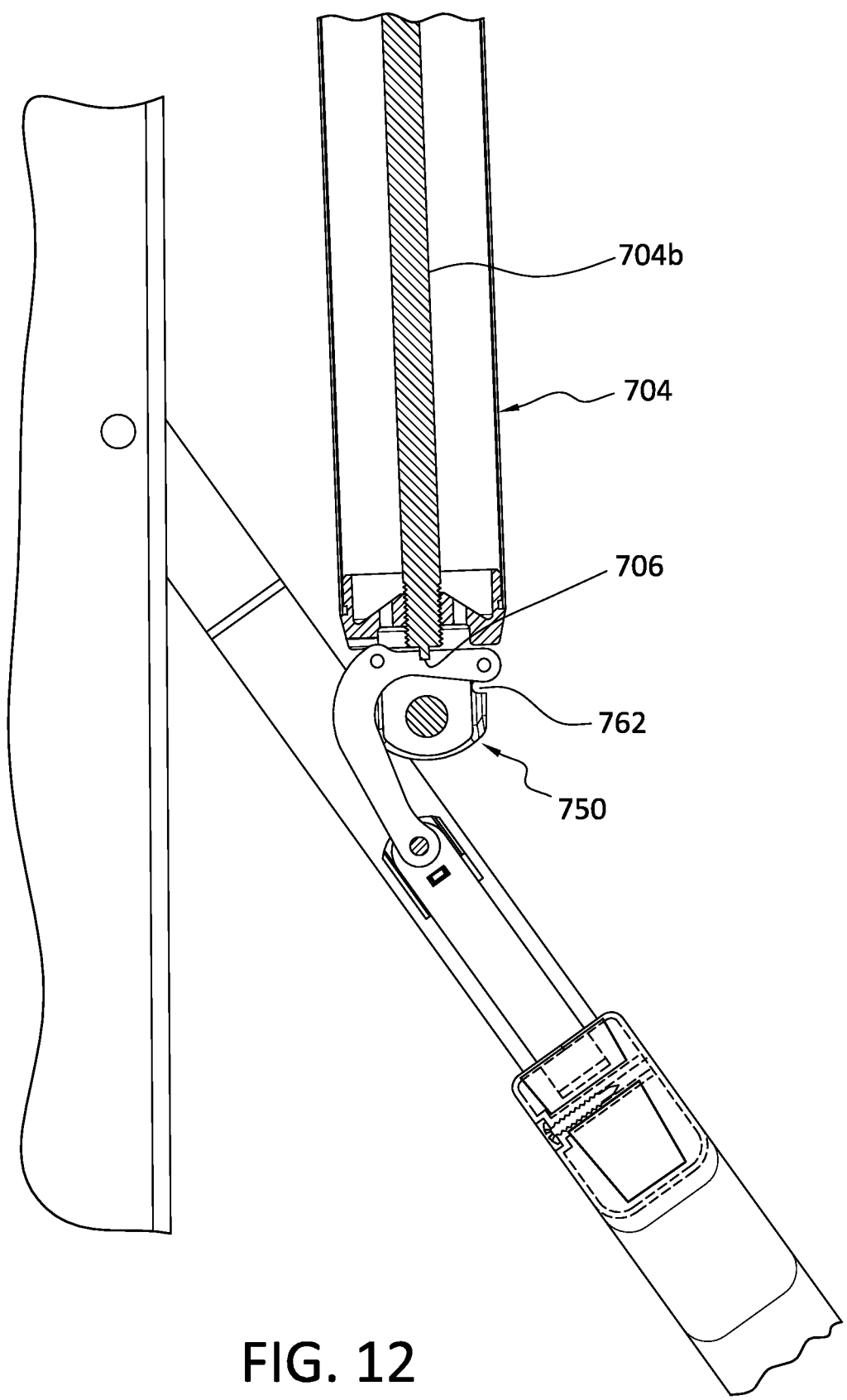
Figure 12A:
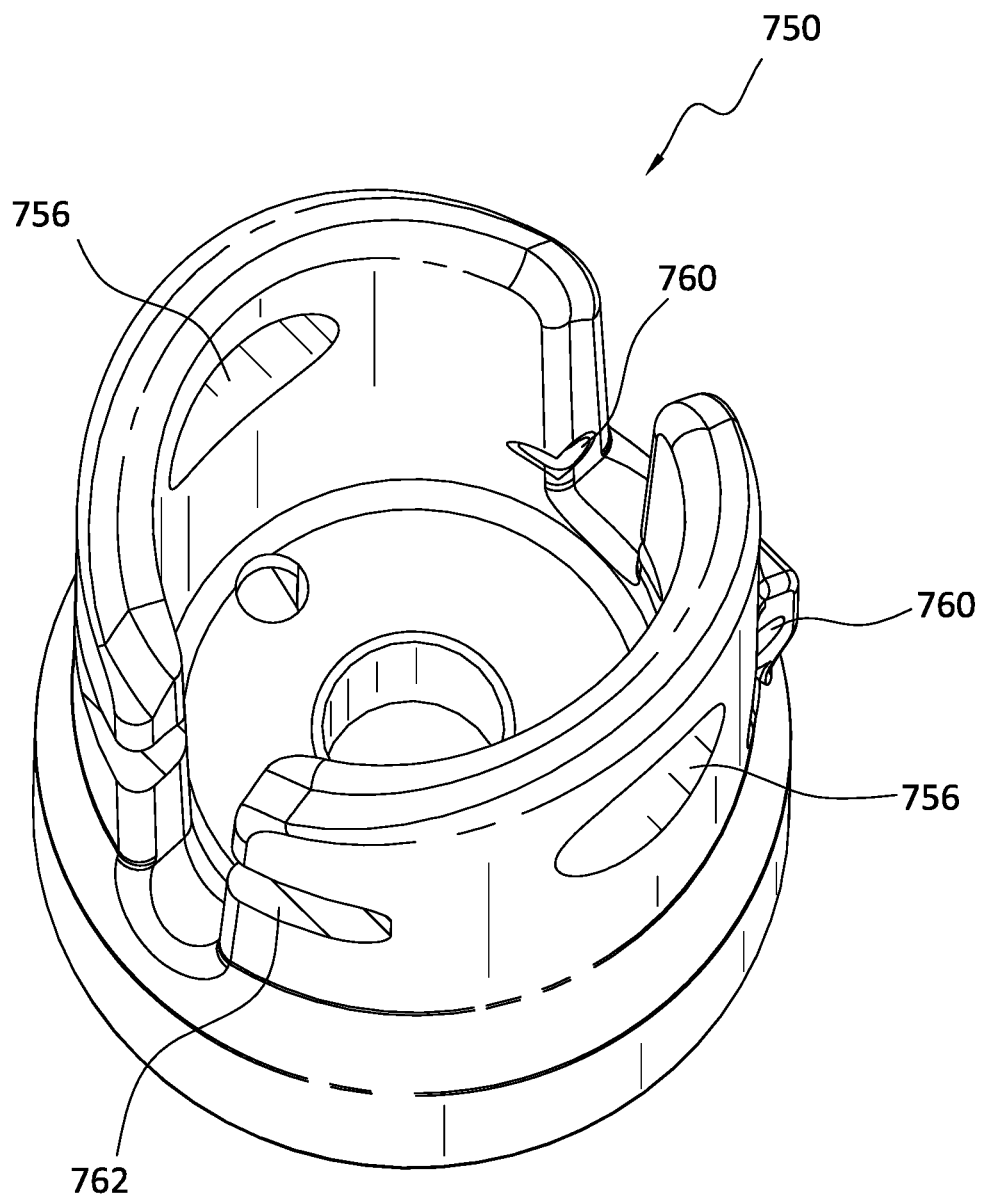
Figure 12B:
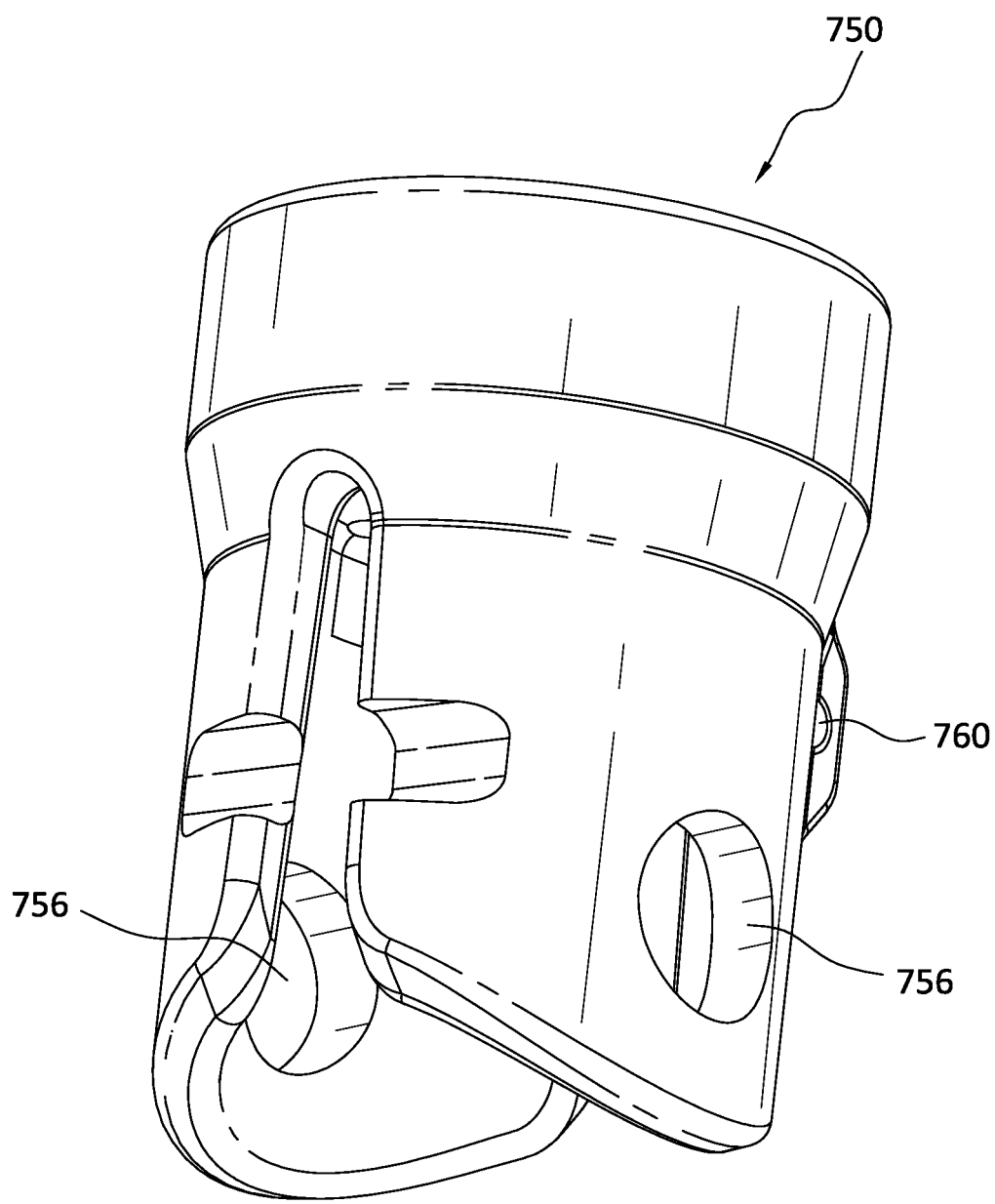
Figure 12C:
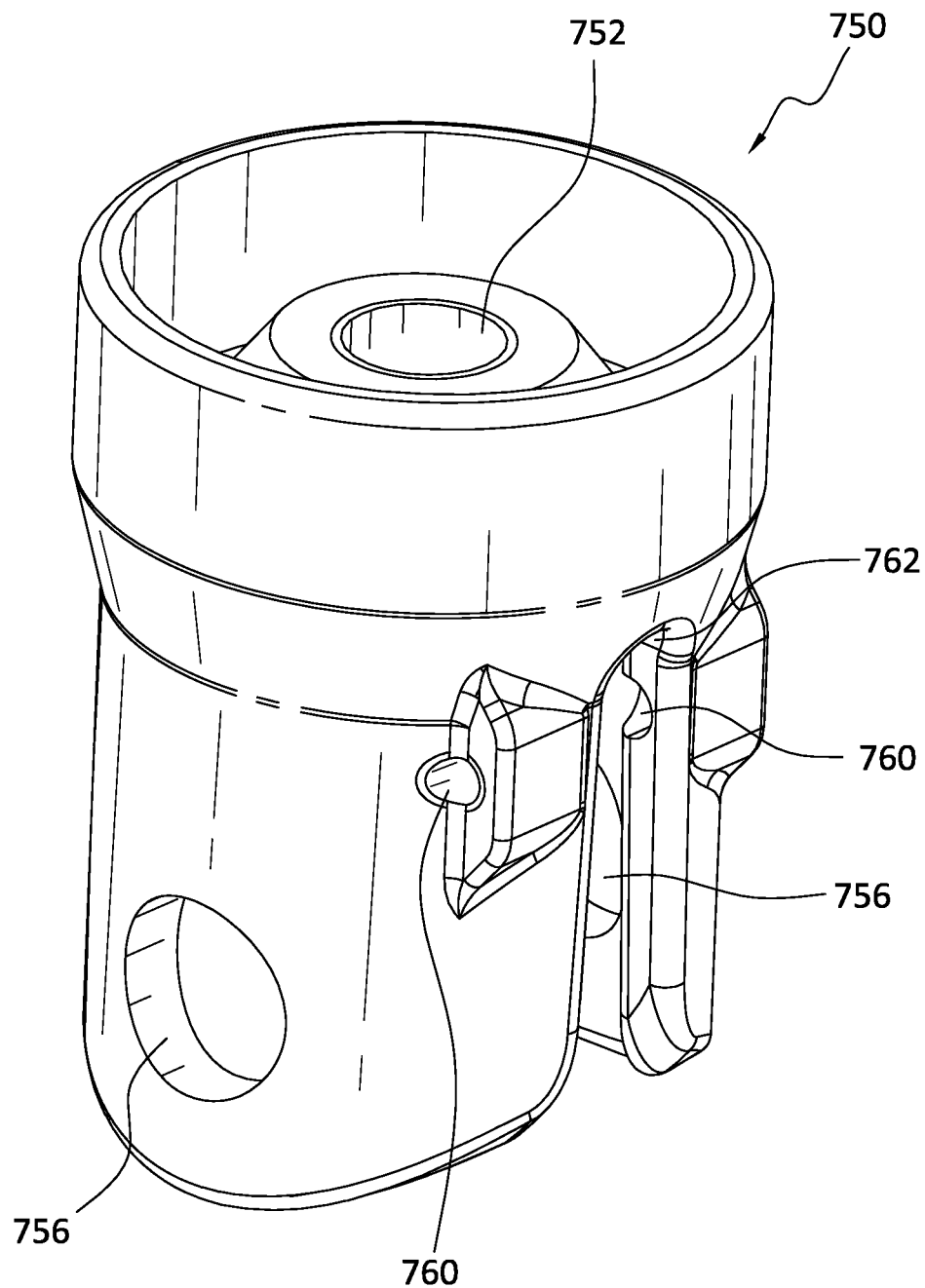
Figure 12D:
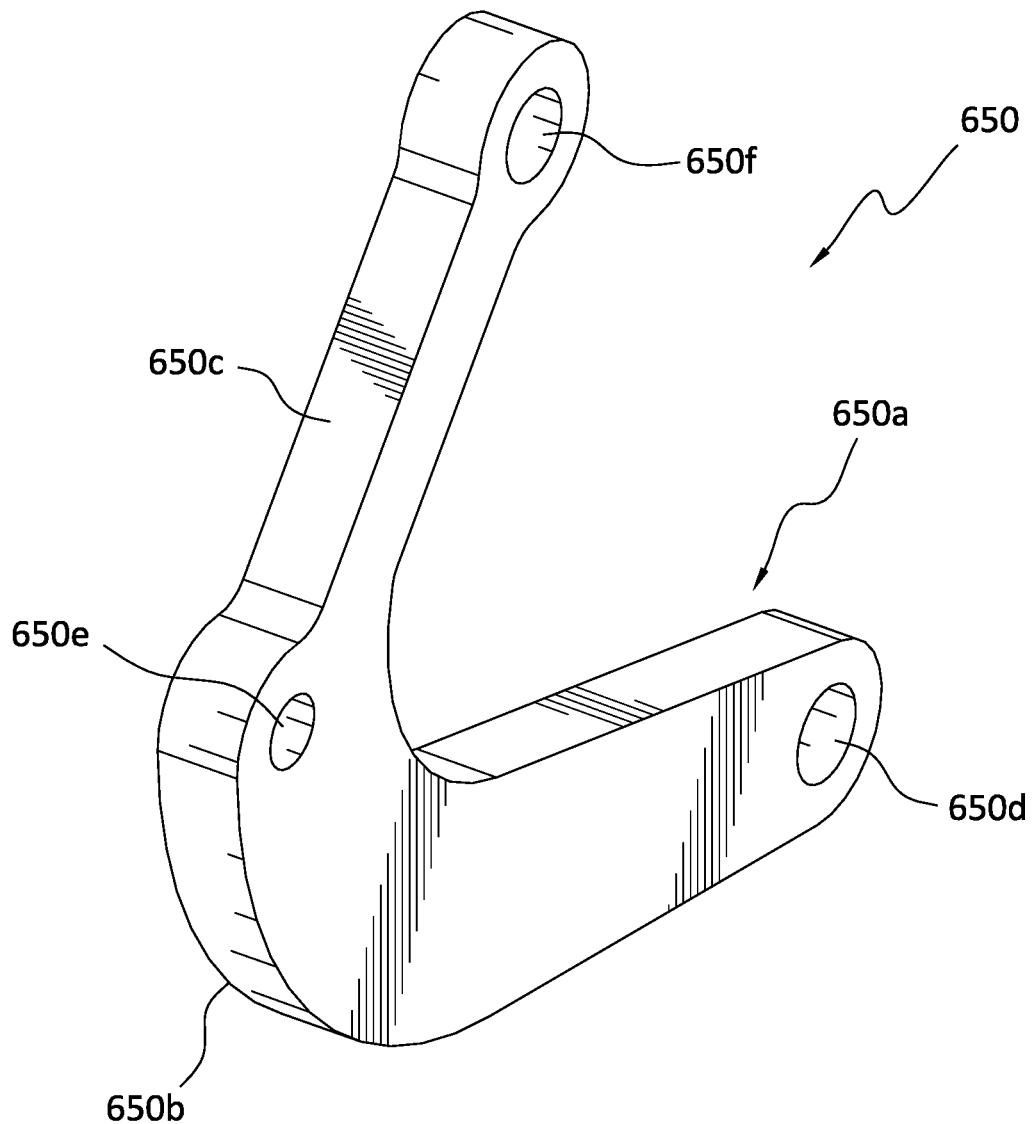
Figure 12E:
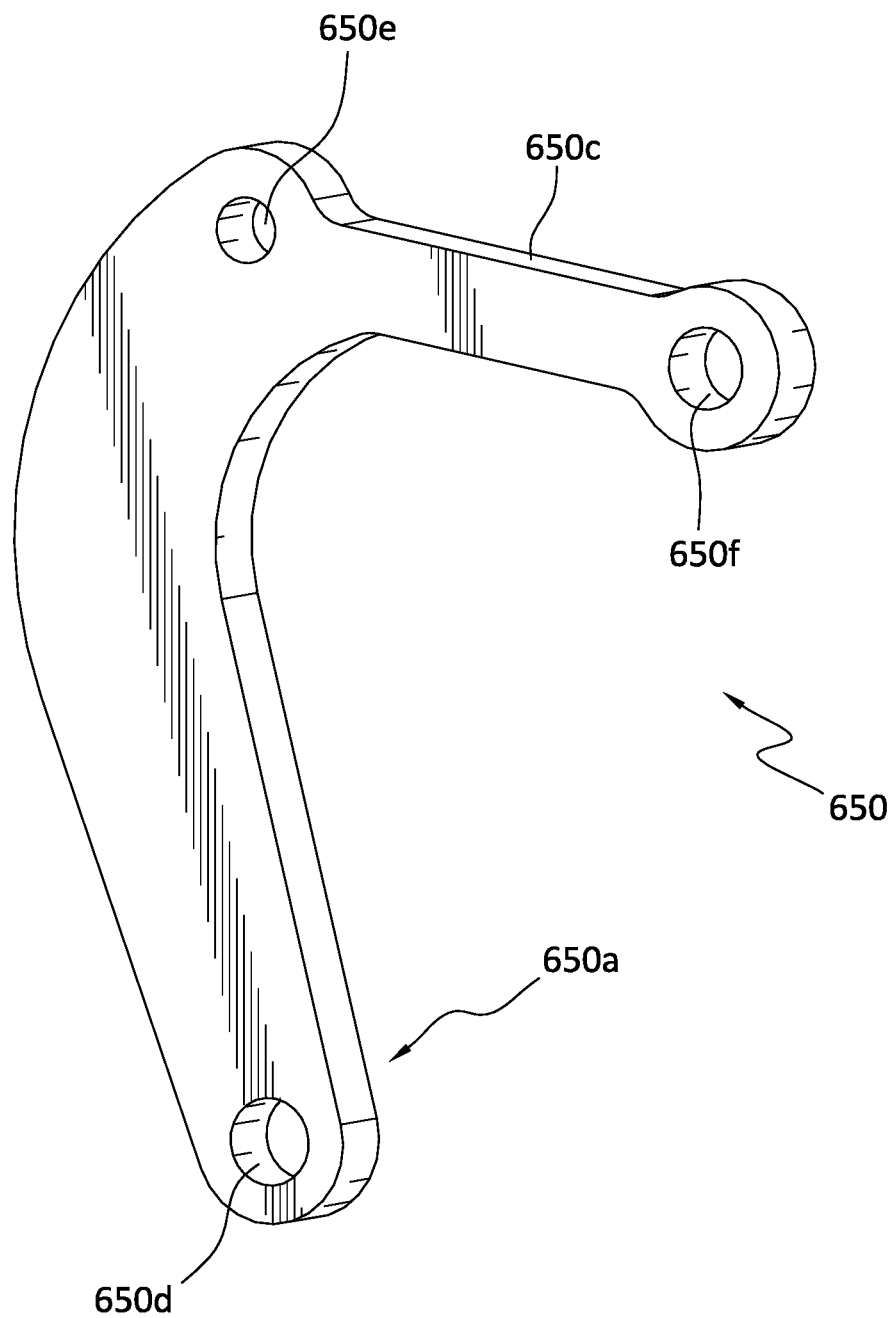
Figure 13:
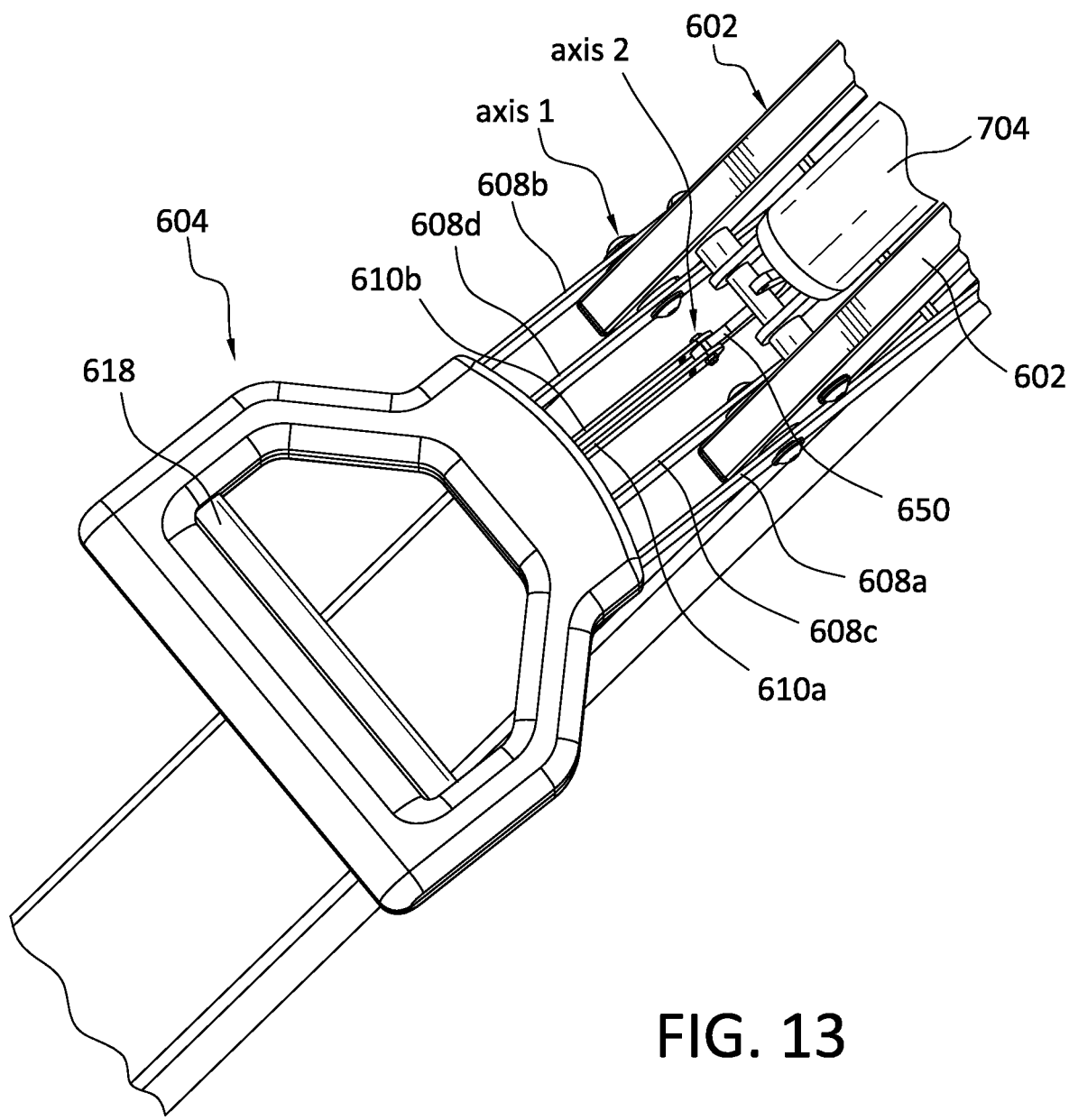
FIGS. 13-16 disclose aspects of a height adjustment mechanism including an adjustment handle with selectively alignable axes.

With particular reference now to FIGS. 11 and 12, as well as FIGS. 12d and 12e, further details are provided concerning the operation of the actuator arm 650 and various associated components. As shown, the gas shock 700 includes a locking pin 706 configured and arranged to be selectively depressed by the upper part 650b of the actuator arm 650 in response to movement of the grip element 618. A cam surface 650c (FIG. 11) on the upper part 650b of the actuator arm may act as a cam in that as the actuator arm 650 rotates, the cam surface 650c moves along the terminal end of the locking pin 706 to either depress the locking pin 706 and thereby unlock the gas shock 700, or release the locking pin 706 from being depressed and thereby lock the gas shock 700. That is, in response to rotation of the actuator arm 650, the cam surface 650c may move the locking pin 706 in a linear fashion. In some embodiments, the cam surface 650c remains in contact with the terminal end of the locking pin 706 at all times, regardless of whether or not the gas shock 700 is unlocked. This arrangement is not required however, and in other embodiments, the cam surface 650c may only contact the locking pin 706 when the locking pin 706 is being depressed by the actuator arm 650. In any of these embodiments, the locking pin 706 may be biased into an extended position that corresponds to a locked state of the gas shock 700.

More specifically, as the arms 610a and 610b move toward the user (that is, in the direction shown by the arrow on element 610a in FIG. 11) when the grip element 618 is squeezed by a user, the actuator arm 650 is caused to rotate counterclockwise about pin 758, causing the upper part 650b of the actuator arm 650 to move upward to depress the locking pin 706, thus unlocking the gas shock 700 and thereby enabling adjustments to the height of the backboard 300.

On the other hand, as the arms 610a and 610b move away from the user when the grip element 618 is released by the user, the actuator arm 650 is caused to rotate clockwise about pin 758, causing the upper part 650b of the actuator arm 650 to move downward to release the biased locking pin 706. As a result, the gas shock 700 assumes a locked state, and further adjustments to the height of the backboard 300 are thereby prevented. That is, and with reference briefly to FIG. 2, because the length of the gas shock 700 is fixed when the gas shock 700 is in the locked state, the arms 602 to which the rod 704 of the gas shock 700 is connected are prevented from moving because the rod 704 cannot extend or retract. Correspondingly, the arms 504, which are connected both to the arms 602 and the backboard 300, are likewise prevented from moving.

E. Aspects of Alignable Axes

With the foregoing discussion in view, and with particular reference now to FIGS. 9 and 13-16, further details are provided concerning various operational aspects of the height adjustment mechanism 600. As indicated, the connection points of the arms 608a, 608b, 608c, and 608d, to the arms 602 define a laterally extending axis1. As well, the connection points of the arms 610a/b to the actuator arm 650 define a laterally extending axis2.

Figure 14:
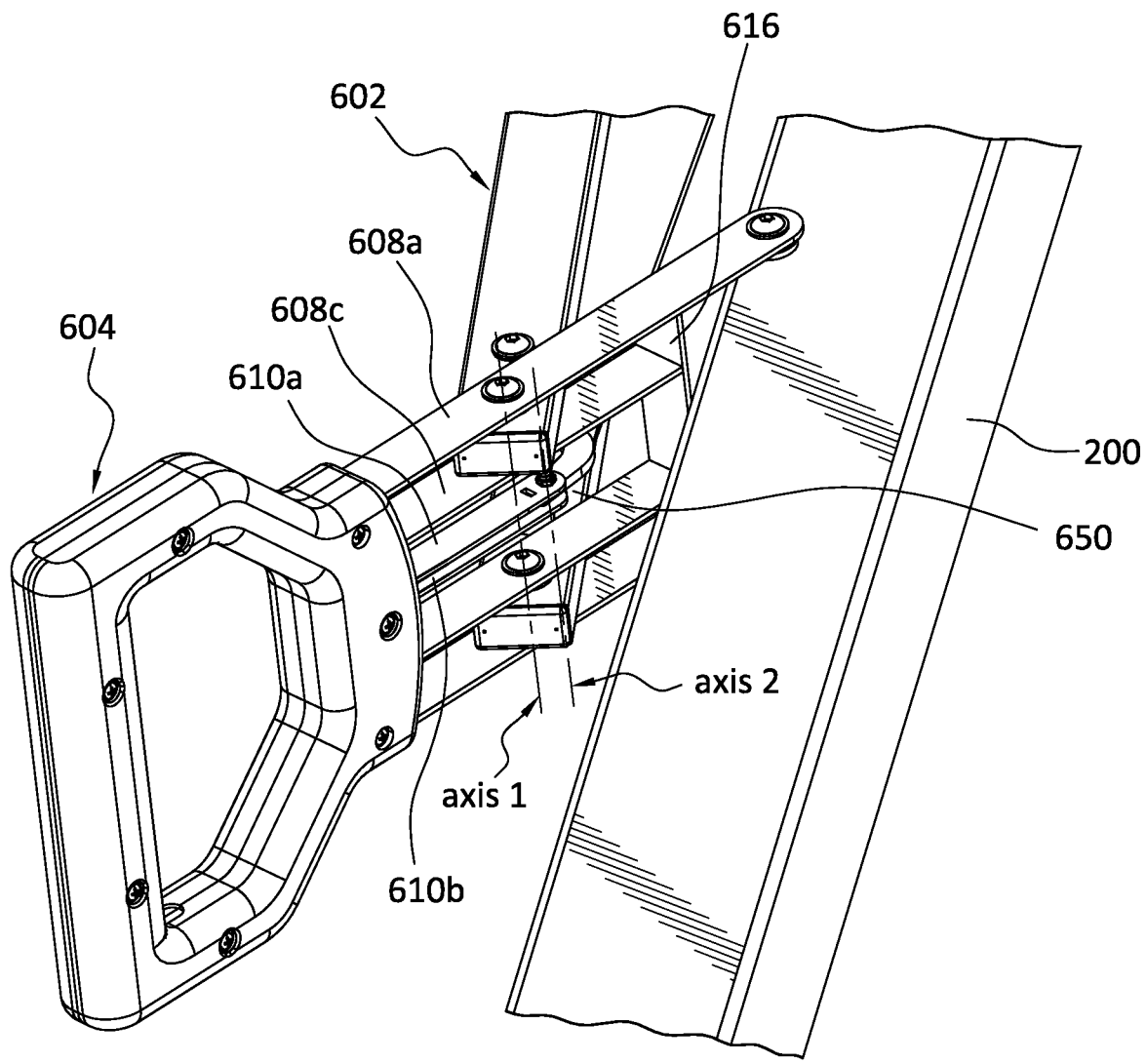
Figure 15:
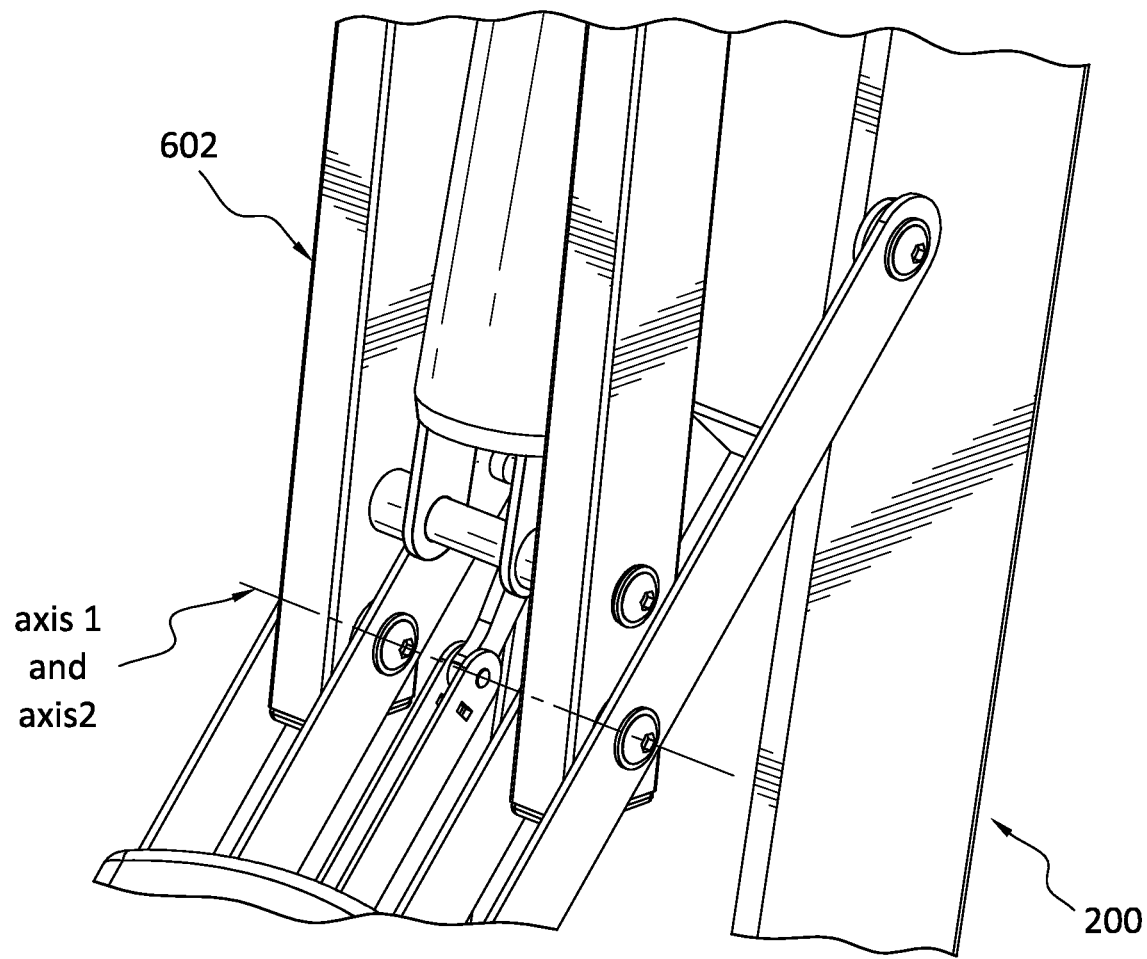
Figure 16:
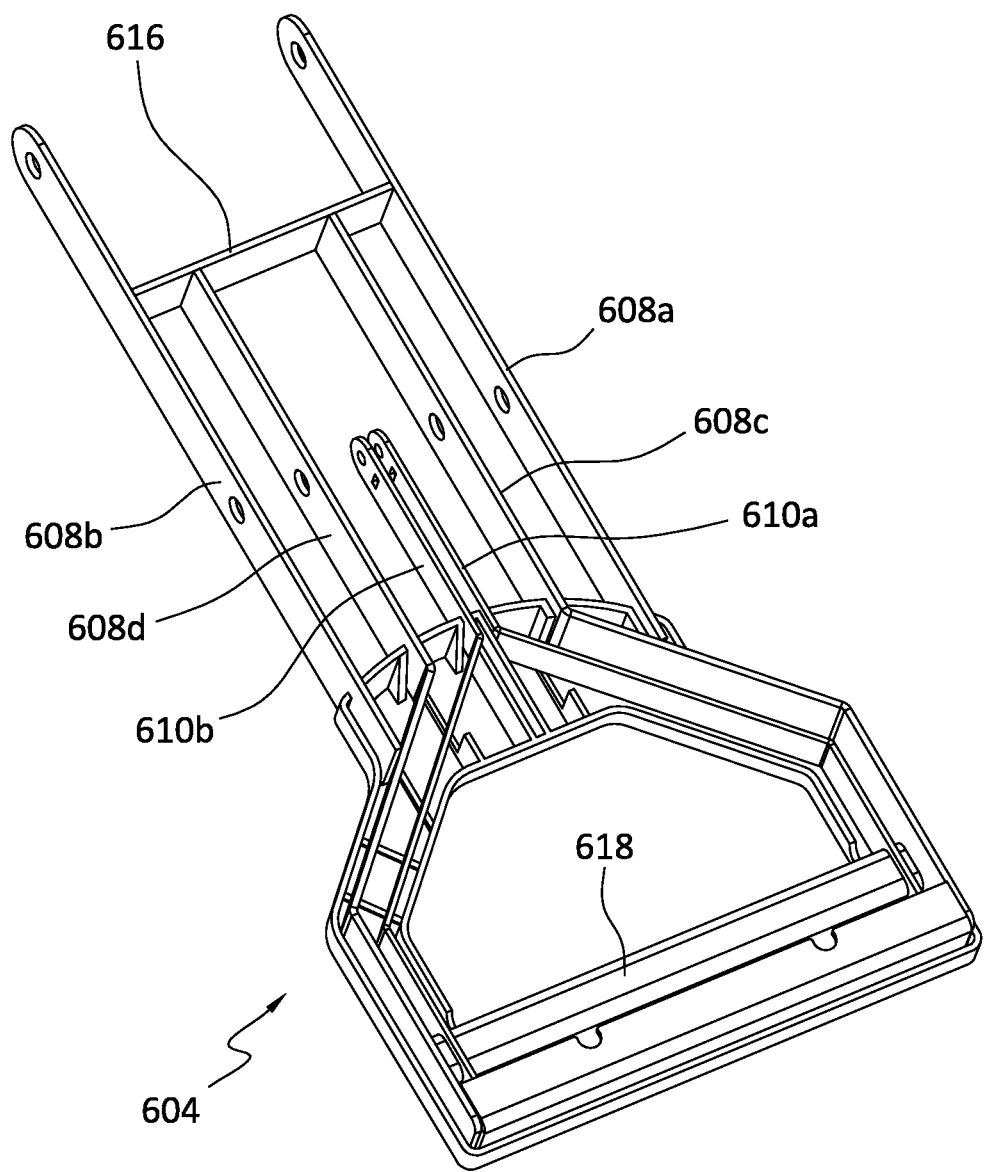

In general, embodiments of the invention are configured so that a user can selectively bring axis1 and axis2 into substantial alignment with each other, and also selectively move axis1 and axis2 out of substantial alignment with each other. These movements are effected, respectively, when the user squeezes the grip element 618 to overcome a bias imposed indirectly on the grip element 618 by the locking pin 706 or imposed, alternatively, by a biasing element of the adjustment handle 604, and when the user releases the grip element 618. As best shown in FIG. 14, when axis1 and axis2 are unaligned relative to each other, movement of the adjustment handle 604 is prevented. When axis1 and axis2 are substantially aligned with each other, the adjustment handle 604 can be moved so as to change the height of the backboard 300 by unlocking the gas shock 700.

As contemplated herein, and with reference to the example of FIGS. 13-16, "substantial alignment" of axis1 and axis2 with respect to each other refers to a configuration and arrangement in which an offset between axis1 and axis2 is in a range of about 0 inches to about 0.125 inches. A configuration in which the offset between axis1 and axis2 is outside of this range is considered to be a configuration in which axis1 and axis2 are unaligned with each other. In at least some embodiments, axis1 and axis2 lie in the same plane with each other, regardless of whether they are substantially aligned, or unaligned.

As noted elsewhere herein, when the grip element 618 is squeezed, the arms 610a/b, which are connected to the actuator arm 650, overcome a bias imposed by the locking pin 706, and/or by a biasing element of the adjustment handle 604 such as one or more springs positioned between the grip element 618 and another portion of the adjustment handle 604 so as to move the grip element 618 away from the user. When the bias, however imposed, is overcome, the actuator arm 650 is free to move, and does move, in such a way that the upper portion 650b of the actuator arm 650 rotates about the pin 758 into a position at which the locking pin 706 is depressed by the actuator arm 650, thus unlocking the gas shock 700 and enabling the height and/or orientation of the backboard 300 to be adjusted.

On the other hand, when the grip element 618 is released, the bias exerted by the locking pin 706 and/or by a biasing element of the adjustment handle 604 is free to act and causes the actuator arm 650, under the influence of the movement of the arms 610a and 610b, to automatically rotate to a position where the locking pin 706 is no longer depressed, thus locking the gas shock 700 so that movement of the backboard 300 is prevented. As made clear by the foregoing, at least some embodiments are configured so that when the grip element 618 has been released, the fail-safe position of the locking pin 706 is such that the gas shock 700 is locked and movement of the backboard 300, connecting structure 500, and height adjustment mechanism 600 is prevented.

As this disclosure makes clear, movement of axis2 into substantial alignment with axis1, by squeezing the grip element 618, not only enables movement of the adjustment handle 604, but simultaneously unlocks the gas shock 700. Thus, a single movement by the user, that is, squeezing the grip element 618, performs both of these operations. Moreover, when the user releases the grip element 618 after the backboard 300 has been moved to the desired position, axis2 automatically moves out of alignment with axis1, and the gas shock is locked, securely retaining the backboard 300 in the desired position.

With particular reference to FIGS. 11 and 12, some embodiments may enable an additional measure of safety and security. For example, as shown in those Figures, the actuator arm 650 may define an opening 650f through which a pin, lock, bolt, or other element (not shown) can be removably inserted. Part of the pin or other element may reside in a lateral channel 762, defined in the clevis 750, when the opening 650f is aligned with the channel 762. When a pin, or other similar element, is present in the opening 650f, the actuator arm 650 is prevented from rotating (counterclockwise in FIG. 12) into a position in which the locking pin 706 is depressed by the actuator arm 650.

F. Advantageous Aspects of Some Embodiments

As will be apparent from the disclosure, one or more embodiments of the invention can provide one or more advantageous and unexpected effects, in any combination, some examples of which are set forth below. It should be noted that such effects enumerated herein are neither intended, nor should be construed, to limit the scope of the claimed invention in any way.

For example, one or more embodiments of the invention may be advantageous inasmuch as they provide for a height adjustment mechanism that can be unlocked and moved in a single operation by a user. As another example, embodiments of the invention may employ only a single gas shock, or other biasing/damping element and, as such require fewer parts and are relatively mechanically simple as compared with conventional designs. Moreover, embodiments of the invention are configured to automatically assume, such as under the influence of a biasing element, or an element acted upon by a biasing element, for example, a safe, locked, configuration or state in which the backboard cannot move when the user, for whatever reason, releases the grip element of the adjustment handle. As well, at least some embodiments of the invention provide for a supplemental locking device that prevents operation of the adjustment handle until the locking device is removed by the user. As another example, embodiments of the invention enable the simultaneous alignment of axes, such that the adjustment handle can rotate, with the unlocking of the gas shock, that is, both of these operations can be performed at the same time with a single action of the user, namely, by squeezing the grip element. Finally, it will be appreciated that the functionality disclosed herein is not limited to basketball systems, but may likewise be employed in any system in which there is a need to adjust the position, such as by raising and lowering, of an element whether with regard to a reference surface or other reference element. Illustrative examples of such other systems include lifting jacks, and lift tables.

G. Some Further Example Embodiments

Embodiment 1. A system, comprising: a support structure; a component; a connecting structure configured to connect the component to the support structure; and a height adjustment mechanism configured to adjust a position of the component, comprising: one or more arms rotatably connected to the connecting structure; an adjustment handle rotatably connected to the one or more arms and to the support structure; a gas shock including a locking pin and rotatably connected to the support structure, to the one or more arms, and to the adjustment handle; and an actuator arm rotatably connected to the adjustment handle and configured to change position with respect to the locking pin of the gas shock when the adjustment handle is operated.

Embodiment 2. The system as recited in embodiment 1, wherein the height adjustment mechanism is configured to adjust a position of the component relative to a reference surface.

Embodiment 3. The system as recited in embodiment 1, wherein the actuator arm is configured to assume a first position in which the actuator arm depresses the locking pin of the gas shock such that the gas shock is in an unlocked state, and the actuator arm is also configured to assume a second position in which the locking pin of the gas shock is not depressed by the actuator arm such that the gas shock is in a locked state.

Embodiment 4. The system as recited in embodiment 1, wherein the actuator arm rotates in response to a linear motion of a portion of the adjustment Embodiment 5. The system as recited in embodiment 1, wherein the adjustment handle comprises a first portion and a second portion that is configured to move linearly relative to the first portion of the adjustment handle, and the actuator arm is connected to the second portion.

Embodiment 6. The system as recited in embodiment 5, wherein linear motion of the first portion of the adjustment handle causes both linear and rotational motion of the actuator arm.

Embodiment 7. The system as recited in embodiment 1, wherein the actuator arm comprises a cam surface configured to contact a locking pin of the gas shock.

Embodiment 8. The system as recited in embodiment 7, wherein a rotational movement of the actuator arm causes a linear movement of the locking pin.

Embodiment 9. The system as recited in embodiment 1, wherein the adjustment handle is configured so that the actuator arm is biased into a position in which a locking pin of the gas shock is not depressed by the actuator arm.

Embodiment 10. The system as recited in embodiment 1, wherein the gas shock is the only gas shock that is included in the height adjustment mechanism.

Embodiment 11. The system as recited in embodiment 1, wherein an overall length of the gas shock is adjustable when the gas shock is in an unlocked state.

Embodiment 12. The system as recited in embodiment 1, wherein the connecting structure is rotatably connected to the component and to the support structure.

Embodiment 13. The system as recited in embodiment 1, wherein the actuator arm is rotatably connected to the gas shock.

Embodiment 14. The system as recited in embodiment 1, wherein the adjustment handle comprises a first portion that is connected to the one or more arms, and the adjustment handle comprises a second portion that is movable relative to the first portion and is connected to the actuator arm.

Embodiment 15. The system as recited in any of embodiments 1-14, wherein the component comprises a backboard.

Although this disclosure has been described in terms of certain example embodiments, other embodiments apparent to those of ordinary skill in the art are also within the scope of this disclosure.

What is claimed is:

1. A system, comprising:
a support structure;
a component;
a connecting structure that rotatably connects the component to the support structure; and
a height adjustment mechanism operable to adjust a position of the component, comprising:
one or more arms rotatably connected to the connecting structure;
an adjustment handle that is rotatably connected to the one or more arms by a first fastener that defines a first axis and is also rotatably connected to the support structure;
a gas shock rotatably connected to the support structure, and to the one or more arms;
an actuator arm rotatably connected to the adjustment handle by a second fastener that defines a movable second axis about which the adjustment handle is rotatable when the movable second axis is moved into collinear alignment with the first axis by the adjustment handle, and the actuator arm is also connected to the gas shock, and the actuator arm is operable by the adjustment handle to unlock the gas shock to enable adjustment of the position of the component.

2. The system as recited in claim 1, wherein the height adjustment mechanism is operable to adjust a position of the component relative to a reference surface when the gas shock is in an unlocked state.

3. The system as recited in claim 1, wherein the actuator arm is operable to assume a first position in which the actuator arm depresses a locking pin of the gas shock such that the gas shock assumes an unlocked state, and the actuator arm is also configured to assume a second position in which the locking pin of the gas shock is not depressed by the actuator arm such that the gas shock assumes a locked state.

4. The system as recited in claim 1, wherein the actuator arm rotates in response to a first linear movement, and a second linear movement, of a handle portion of the adjustment handle.

5. The system as recited in claim 4, wherein the first linear movement and the second linear movement of the handle portion of the adjustment handle cause both linear and rotational motion of the actuator arm.

6. The system as recited in claim 1, wherein the actuator arm comprises a lever that contacts a locking pin of the gas shock.

7. The system as recited in claim 6, wherein a rotational movement of the actuator arm causes the lever to impart a linear movement to the locking pin.

8. The system as recited in claim 1, wherein the actuator arm is biased into a position in which a locking pin of the gas shock is not depressed by the actuator arm.

9. The system as recited in claim 8, wherein the actuator arm is biased either by the locking pin, or by a biasing element of the adjustment handle.

10. The system as recited in claim 1, wherein when the gas shock is in a locked state, changes to a position and orientation of the component are prevented.

11. The system as recited in claim 1, wherein the component comprises a backboard to which a goal is attached.

12. The system as recited in claim 11, wherein the height adjustment mechanism is operable to adjust a position of the backboard relative to a reference surface.

13. The system as recited in claim 1, wherein the adjustment handle cannot freely rotate about the first axis without binding when the first axis and the second axis are out of alignment with each other.

14. The system as recited in claim 1, wherein the actuator arm has a curved shape.

15. The system as recited in claim 1, wherein the adjustment handle comprises an arm that is connected to the actuator arm and the arm of the adjustment handle is operable to move linearly to impart a rotational motion to a portion of the actuator arm which causes the actuator arm to depress a locking pin of the gas shock such that the gas shock assumes an unlocked state.

* * * * *